(12) United States Patent
Kihara

(10) Patent No.: US 6,339,677 B1
(45) Date of Patent: Jan. 15, 2002

(54) PICTURE SIGNAL RECORDING AND REPRODUCING APPARATUS AND PICTURE SIGNAL RECORDING AND REPRODUCING METHOD

(75) Inventor: Toshiaki Kihara, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/077,157

(22) PCT Filed: Sep. 26, 1997

(86) PCT No.: PCT/JP97/03447

§ 371 Date: Sep. 14, 1998

§ 102(e) Date: Sep. 14, 1998

(87) PCT Pub. No.: WO98/14008

PCT Pub. Date: Apr. 2, 1998

(30) Foreign Application Priority Data

Sep. 27, 1996 (JP) .............................. 8-256643

(51) Int. Cl.$^7$ .......................... H04N 5/781; H04N 5/83; H04N 5/90
(52) U.S. Cl. .......................... 386/125; 386/45; 386/124
(58) Field of Search .................................. 386/124, 125, 386/126, 105, 106, 46, 45, 40, 76, 47, 114, 115, 109, 111, 112, 107, 117, 38; H04N 5/781, 5/83, 5/90

(56) References Cited

U.S. PATENT DOCUMENTS 4,597,020 A   6/1986  Wilkinson
5,754,730 A * 5/1998 Windrem et al. ............ 386/124
6,115,536 A * 9/2000 Uwasaki et al. ............. 386/106

FOREIGN PATENT DOCUMENTS

| EP | 0125840 A1 | 11/1984 |
| JP | 60-5688 | 1/1985 |
| JP | 1-228382 | 9/1989 |
| JP | 7-38854 | 2/1995 |
| JP | 7-235151 | 9/1995 |

* cited by examiner

*Primary Examiner*—Robert Chevalier
(74) *Attorney, Agent, or Firm*—Frommer Lawrence & Haug LLP; William S. Frommer; Bruno Polito

(57) ABSTRACT

An object of the present invention is to provide a picture signal recording and reproducing apparatus by which adjacent normal picture elements can be reproduced even when there is a hard disc in trouble. The picture signal recording and reproducing apparatus of the present invention records adjacent picture element data in different data hard discs (72) by a picture element insertion processing block (10), when writing the picture signal data in 7 pieces of data hard discs (72), and it returns the picture element data of the picture signal data to the adjacent picture element data by a picture element deletion processing block (12), when reading out the picture signal data. Therefore, the probability that adjacent picture elements are read out in a normal state, is high even when either of the data hard discs (72) is in trouble, so that the quality of the reproduced picture can be improved.

40 Claims, 9 Drawing Sheets

PICTURE SIGNAL RECORDING AND REPRODUCING APPARATUS AND PICTURE SIGNAL RECORDING AND REPRODUCING METHOD

TECHNICAL FIELD

The present invention relates to a picture signal recording and reproducing apparatus which performs write-in and read-out of a plurality of hard discs used for, for example, a video server.

BACKGROUND ART

Previously, there has been a video server apparatus which supplies various types of pictures to individual users at the same time on the basis of the requirements of a large number of users. The video server apparatus is composed of a video stream server for performing transmission processing of a picture stream, and an application server for performing unreal time processing such as a navigation function or the like.

The application server on one side bears a central role in transmitting and receiving an information, and has a function of processing of a network protocol necessary for receiving and sending the information. Furthermore, the application server has an administrative data base, and controls applications, administrative information, customer information and the like in that administrative database.

The video stream server on the other side has a plurality of hard discs for storing data, a single hard disc for storing parity, an RAID (Redundant Arrays Inexpensive Discs) controller for performing the processing of write-in and read-out of the data for those hard discs, and a processor which performs conversion and rearrangement of the data and performs the data transmission. The video stream server is called an RAID apparatus.

In FIG. 1, an arrangement of a disc array apparatus composing a general RAID apparatus in the prior art is shown. The disc array apparatus has an input/output data control section (processor) 1 for converting an input data and a command into a SCSI (Small Computer System Interface) protocol and a SCSI command, a disc array controller (RAID controller) 2 which divides or integrates the data and controls write-in and read-out of the data, and a hard disc 3 composed of a HDD (Hard Disc Drive) 1,a HDD 2,a HDD 3,a HDD 4 . . . a HDD 7 for dispersedly storing the data and a HDD P capable of storing the parity. Here, the HDD P can be used for parity record only, but it can also be used for data record.

The action of the disc array apparatus like this will be described below. When recording a picture signal data, at the input/output data control section 1, for example, a supplied bit stream is divided into striping units of 1 word (8 bits). The reason why the bit stream is divided into 1 word like this is that the bit stream should be striped at the unit of 1 word corresponding to the picture element data since 1 picture element is composed of 8 bits and 8 bits correspond to 1 word. The divided striping units are accumulated in 7 pieces of data storing hard discs HDD 1, HDD 2, HDD 3, HDD 4 . . . HDD 7 by the disc array controller 2. The reason is that by dispersedly accumulating the units in 7 pieces of hard discs HDD 1, HDD 2, HDD 3, HDD 4 . . . HDD 7, the number of users who use the same picture at the same time, can be made to be larger. As the way of dispersed accumulation, there are a random layout and a striping layout. The random layout is suitable for the accumulation of a picture of the multi-rate, and the striping layout is characterized in that the operation efficiency of the disc is high. The segment data dispersedly accumulated by the striping layout are called striping units. Furthermore, by calculating the exclusive-OR(EXCLUSIVE-OR) of 7 pieces of bit data composed of respective head end bits of the bit stream of 7 words dispersedly accumulated in the 7 pieces of hard discs HDD 1, HDD 2, HDD 3, HDD 4 . . . HDD 7, a first parity bit P is produced. Similarly to the action to produce the first parity bit, by calculating the exclusive-OR of 7 pieces of bit data composed of the second bit of each word, a second parity bit P is produced. After that, continuously performing the same action, an eighth parity bit P is produced by calculating the exclusive-OR of 7 pieces of bit data composed of the eighth bit of each word, so that 8 bits of parity data are produced. The parity data 8 produced like this are recorded in the HDD P.

When reproducing the picture signal data, the disc array controller 2 reads out the striping units from the hard disc 3 according to an allocation table showing the data array relating to which hard disc accumulates the striping unit. Then, the input/output data control section 1 rearranges the read out striping units in the reproducing order, and absorbs the fluctuation and transmits them to a network. Furthermore, special reproducing functions such as a slow reproduction, a fast forward, a pause, a skip or the like are achieved by controlling the speed at which the disc array controller 2 reads out the striping units.

Furthermore, when writing in the data, the disc array controller 2 disperses the striping units to a plurality of hard discs, and on the other hand, gathers the dispersed striping units to one data stream when reading out the data.

In a disc array apparatus like this, 1 picture element or some continuous elements are recorded in each hard disc in order as a unit for every horizontal scanning line, and in this case, the upper and lower picture elements of the picture signal data and the same picture elements of the preceding and succeeding frames are recorded in the same hard disc. The recording action thereof will be described below.

Here, by using FIG. 2, the recording action in dispersedly recording the picture signal data into hard discs in this disc array apparatus, will be described. Here, the description will be given as for the picture element, wherein as mentioned above, 1 picture element is composed of 8 bits and 8 bits correspond to 1 word. FIG. 2 is a diagram of recording action in a case where a picture signal with A pieces of effective picture elements for every horizontal scanning line and M pieces of scanning lines for every 1 frame is dividedly recorded in 7 units of data hard discs. In FIG. 2, each square shows 1 picture element of each picture signal, and the numbers 1 to 7 in that show the numbers of the data hard discs (HDD 1 to HDD 7) in which the picture elements are recorded. Furthermore, the HDD P is a hard disc for recording parity. In FIG. 2, an effective picture element range 4 in the horizontal direction of the picture signal shown by A is composed of each of the picture elements of 1, 2, . . . , 6, 7, 1, 2, . . . , 6, 7 in the scanning line 1 in the vertical direction, and similarly, it is composed of each of the picture elements of 1, 2, . . . , 6, 7, 1, 2, 6, 7 in the scanning line 2 in the vertical direction, and it is composed of each of the picture elements of 1, 2, . . . , 6, 7, 1, 2, . . . , 6, 7 in the scanning line 3 in the vertical direction, . . . and it is composed of each of the picture elements of 1, 2, 6, 7, 1, 2, . . . , 6, 7 in the scanning line M in the vertical direction.

At this time, since the number A of effective picture elements becomes a multiple of 7 which is, the number of the data hard discs, the adjacent picture element data in the vertical direction are recorded in the 7 pieces of data storing hard discs HDD 1, HDD 2, HDD 3, HDD 4 . . . , HDD 7. That is, in the hard disc HDD 1, M pieces of 1, 1, 1, . . . , 1 are recorded as the record picture element 5, and in the hard disc HDD 2, M pieces of 2, 2, 2, . . . , 2 are recorded as the record picture element 6, and in the hard disc HDD 7, M pieces of 7, , 7, 7, . . . 7 are recorded as the record picture element 7.

In a disc array apparatus like this, apart from storing usual data in the 7 pieces of data storing hard discs HDD 1, HDD 2, HDD 3, HDD 4 . . . HDD 7, by providing a hard disc HDD P for writing in the parity, the data in which an error has occurred are arranged to be restored on the basis of the parity data 8 of the hard disc HDD P for parity when a trouble has occurred.

PROBLEMS TO BE SOLVED BY THE INVENTION

However, the conventional disc array apparatus like this has the following inconvenience: Since the upper and lower picture elements of the picture signal data and the same picture elements of the preceding and succeeding frames are recorded in the same hard disc, the picture element of [2] shown by the record picture element 6 becomes in error in cases where not less than 2 units of hard discs breakdown, for example, in a case where the data hard disc HDD 2 breaks down in FIG. 2, and consequently, the upper and lower picture elements of [2] of the picture signal data and the picture elements equal to [2] of the preceding and succeeding frames are also in error, so that the enormous data cannot be used for the interpolation of the picture element data, and the picture element data in the lateral direction and in the diagonal direction of the picture signal data can only be effective, and the picture element data in the lateral direction and in the diagonal direction can be used for the interpolation of the picture element data, but if the hard disc in which the picture element data in the lateral direction and in the diagonal direction are recorded, is also out of order, the interpolation should be performed by using the picture element data at a farther position, and therefore, the picture quality after the interpolation is lowered and the scale of the circuit is increased.

DISCLOSURE OF THE INVENTION

The present invention is made in view of such points, and an object thereof is to provide a picture signal recording and reproducing apparatus by which the adjacent normal picture elements can be reproduced even when there is a wrong hard disc in write-in and read-out of a plurality of hard discs used as a video server.

MEANS TO SOLVE THE PROBLEMS

The picture signal recording and reproducing apparatus of the present invention is a picture signal recording and reproducing apparatus having a plurality of recording media and a write-in and read-out control means for controlling writing-in and reading-out of the picture signal data for the plurality of recording media, which comprises a picture element control means which records the adjacent picture element data of the picture signal data in different recording media respectively when writing the picture signal data in the plurality of recording media by the write-in and read-out control means. Furthermore, in the picture signal recording and reproducing apparatus of the present invention, the picture element control means is to return the picture element data of the picture signal data to the adjacent picture element data when reading out the picture signal data recorded in the plurality of recording media by the write-in and read-out control means.

Moreover, the picture signal recording and reproducing apparatus of the present invention is a picture signal recording and reproducing apparatus having a plurality of recording and reproducing units each being independently driven, which comprises: a striping means for striping a bit stream of a supplied picture signal for every picture element unit; and a record control means for assigning the picture element data striped by the striping means to the plurality of recording and reproducing units so that the adjacent picture element data in the horizontal direction and in the vertical direction of the picture signal may be recorded in different recording and reproducing unit respectively.

Furthermore, the picture signal recording and reproducing method of the present invention is a picture signal recording and reproducing method which records a picture signal into a plurality of recording and reproducing units each being independently driven, and which reproduces the picture signal from the plurality of recording and reproducing units, wherein a bit stream of a supplied picture signal is striped at every picture element unit, and wherein the striped picture element data are assigned to the plurality of recording and reproducing units respectively so that the adjacent picture element data in the horizontal direction and in the vertical direction of the picture signal may be recorded in different recording and reproducing units respectively.

According to the picture signal recording and reproducing apparatus of the present invention, the following actions are performed.

First, the write-in action will be described. When a write-in request is made, a command and picture signal data are supplied to the picture element control means.

In the picture element control means, a dummy picture element is inserted into the effective picture element. That is, in the picture element control means, the effective picture element in the horizontal direction of the picture signal data is extracted at every scanning line. Specifically, the picture element at the left end of the scanning line 1 as a start picture element of the picture frame is detected. From the detected start picture element, the number of effective picture elements in the horizontal direction previously determined in the range of the effective picture element is counted on the basis of a horizontal scanning clock, and if the counted value coincides with the preset value, the count is finished and a coincidence signal is outputted. By the coincidence signal, the dummy picture element is inserted in the range of the effective picture element in the horizontal direction of the scanning line 1.

When the dummy picture element is inserted, the vertical scanning clock 1 is counted from the output signal thereof, and since the value does not coincide with the number of the last scanning line, a discordance signal is outputted. By the discordance signal, the picture element at the left end of the scanning line 2 as the next start picture element is detected. From the detected start picture element, the number of effective picture elements is extracted, and the dummy picture element is inserted in the range of the effective picture element in the horizontal direction of the scanning line 2.

When the dummy picture element is inserted, a vertical scanning clock 2 is counted from the output signal, and since the value does not coincide with the number of the last scanning line, a discordance signal is outputted. By the discordance signal, the picture element at the left end of the scanning line 3 as the next start picture element is detected. From the detected start picture element, the number of effective picture elements is extracted, and the dummy picture element is inserted in the range of the effective picture element in the horizontal direction of the scanning line 3.

After that, continuing the repetition, the first vertical scanning clock from the last is counted, and since the value does not coincide with the number of the last scanning line, a discordance signal is outputted. By the discordance signal, the picture element at the left end of the last scanning line as the next start picture element is detected. From the detected start picture element, the effective picture element is extracted, and the dummy picture element is inserted in the range of the effective picture element in the horizontal direction of the last scanning line.

When the dummy picture element is inserted, the last vertical scanning clock is counted from the output signal, and since the value coincides with the number of the last scanning line, a coincidence signal is outputted. By the coincidence signal, the action in this frame is finished. After that, the action moves to the action of the next frame. Thus, the insertion action of the dummy picture element of each frame is performed in order.

The picture element data of the picture signal into which the dummy picture element is inserted, is supplied to the write-in and read-out control means.

By the write-in and read-out control means, the write-in action is started, and the bit stream of the picture signal is striped at every picture element unit, and the write-in action is performed to a plurality of recording means so that the adjacent picture element data in the vertical direction may be dispersedly accumulated in different recording means respectively.

The action to record the picture element data of the picture signal data into which the dummy picture element is inserted, in the recording means, will be described. Since the dummy picture element is inserted into the effective picture element in the horizontal direction of the picture signal data, different picture element data can be arranged in the vertical direction of the picture signal data, so that it does not occur that all upper and lower picture element data may become in error even when either of the plurality of recording means breaks down.

Next, the action of read-out will be described. When a read-out request is made, a command is supplied to the write-in and read-out control means. By the write-in and read-out control means, the read-out action is started, and the read-out action of the picture element data dispersedly accumulated in a plurality of recording means is performed. The read out divided data are composed to the original data. The composed data are supplied to the picture element control means.

At the picture element control means, the dummy picture element is deleted for the effective picture element. That is, in the picture element control means, the effective picture element in the horizontal direction of the picture signal data is extracted for every scanning line. Specifically, the picture element at the left end of the scanning line 1 as a start picture element of the picture frame, is detected. From the detected start picture element, the number of effective picture elements in the horizontal direction previously determined in the range of the effective picture element is counted on the basis of the horizontal scanning clock, and if the counted value coincides with the preset value, the count is finished and a coincidence signal is outputted. By the coincidence signal, an auxiliary signal data such as a header signal with a synchronization signal or the like relating to the transmission are added to the effective picture element data. In the effective picture element data to which the auxiliary signal data are added, the dummy picture element shown in the range of the record picture element is deleted for the range of the effective picture element in the horizontal direction of the scanning line 1.

When the dummy picture element is deleted, the vertical scanning clock 1 is counted from the output signal thereof, and since the value does not coincide with the number of the last scanning line, a discordance signal is outputted. By the discordance signal, the picture element at the left end of the scanning line 2 as the next start picture element is detected. From the detected start picture element, the horizontal scanning clock is counted, and if the counted value coincides with the preset value, the count is finished and a coincidence signal is outputted. By the coincidence signal, an auxiliary signal data such as a header signal with a synchronization signal or the like relating to the transmission are added to the effective picture element data. In the effective picture element data to which the auxiliary signal data are added, the dummy picture element shown in the range of the record picture element is deleted for the range of the effective picture element in the horizontal direction of the scanning line 2.

When the dummy picture element is deleted, the vertical scanning clock 2 is counted from the output signal thereof, and since the value does not coincide with the number of the last scanning line, a discordance signal is outputted. By the discordance signal, the picture element at the left end of the scanning line 3 as the next start picture element is detected. From the detected start picture element, the horizontal scanning clock is counted, and if the counted value coincides with the preset value, the count is finished and a coincidence signal is outputted. By the coincidence signal, the auxiliary signal data such as a header signal with a synchronization signal or the like relating to the transmission are added to the effective picture element data. In the effective picture element data to which the auxiliary signal data are added, the dummy picture element shown in the range of the record picture element is deleted for the range of the effective picture element in the horizontal direction of the scanning line 3.

After that, continuing the repetition, the first vertical scanning clock from the last scanning line is counted, and since the value does not coincide with the number of the last scanning line, a discordance signal is outputted. By the discordance signal, the picture element at the left end of the last scanning line as the next start picture element is detected. From the detected start picture element, the horizontal scanning clock is counted, and if the counted value coincides with the preset value, the count is finished and a coincidence signal is outputted. By the coincidence signal, the auxiliary signal data such as a header signal with a synchronization signal or the like relating to the transmission are added to the effective picture element data. In the effective picture element data to which the auxiliary signal data are added, the dummy picture element is deleted to the range of the effective picture element in the horizontal direction of the last scanning line.

When the dummy picture element is deleted, the last vertical scanning clock is counted from the output signal thereof, and since the value coincides with the number of the last scanning line, the count is finished if the counted value coincides with the preset value, and a coincidence signal is outputted. By the coincidence signal, the action in this frame is finished. After that, the action moves to the action of the next frame. Thus, the action of deletion of the dummy picture element from each frame is performed in order.

The interpolation processing of the picture element where an error flag is set up, of the picture element data in which the action of deletion of the dummy picture element has been performed, is performed. The interpolation processing is performed, as for the picture element of each point on the picture frame, by referring to the value of the picture element in the vicinity of the point thereof, on the basis of the ideal direction found by a calculation and the error flag of the picture element of each point.

First, the possibility of interpolation and replacement is judged from error flags of 8 points around an object picture element and the ideal direction found by the calculation of 1 direction among the horizontal direction, the vertical direction, the diagonally up to the left direction, and the diagonally up to the right direction. Specifically, whether the error flag of the object picture element is set up or not, is judged. If the error flag of the object picture element is not set up, the data is passed through. If the error flag of the object picture element is set up, whether the interpolation is possible or not, is judged. If the interpolation is possible, whether the interpolation is possible in the ideal direction or not, is judged. If the interpolation is not possible in the ideal direction, whether the interpolation is possible in another direction or not, is judged. The order of priority in determining another direction is the order of the horizontal direction, the vertical direction, the diagonally up to the left direction, and the diagonally up to the right direction.

Next, if the replacement is possible, whether the replacement is possible in the ideal direction or not, is judged. If the replacement is not possible in the ideal direction, whether the replacement is possible in another direction or not, is judged. The order of priority in determining another direction is the order of the horizontal direction, the vertical direction, the diagonally up to the left direction, and the diagonally up to the right direction.

Thus, whether the interpolation or the replacement is possible or not, is judged, and whether the interpolation or the replacement is possible in the ideal direction or in another direction or not, is judged.

Then, if it is judged that the interpolation is possible in the vertical direction, interpolation processing is performed. In the interpolation processing, an interpolation is performed between 2 points in the vertical direction when both the upper and lower 2 points in the vertical direction of the object picture element have no error flag set up. Furthermore, if it is judged that the replacement is possible in the diagonally up to the left direction, replacement processing is performed. In the replacement processing, a replacement is performed simply by either of the upper and lower 2 points in the diagonally up to the left direction of the object picture element, when the either has no error flag set up.

Thus, interpolation and replacement are performed according to error flags of 8 points around the object picture element and the ideal direction found by the calculation of 1 direction among the horizontal direction, the vertical direction, the diagonally up to the left direction, and the diagonally up to the right direction. Accordingly, even if either of the plurality of recording means breaks down, since different picture element data in the up and down direction are read out, the possibility that error flags may be set up at all of some picture element data, is low in interpolation or replacement processing of the picture element data, and therefore, the possibility that error flags of 8 points around the object picture element may be set up, is low, so that the interpolation or replacement processing can be performed by using the picture element of a point adjacent to the object picture element.

The picture signal data subjected to the interpolation processing or the replacement processing are transmitted. Thus, the read-out of the material of a series of programs or the like comes to an end.

Thus, by inserting a redundant picture element at the end of each scanning line, the adjacent picture elements between each scanning line can be recorded in different recording means, and therefore, even if a recording means breaks down, the probability that the normal adjacent picture elements may be reproduced, is high, so that the interpolation of the picture by using the adjacent picture elements may become easy.

BEST MODE FOR CARRYING OUT THE INVENTION

Figure 1:
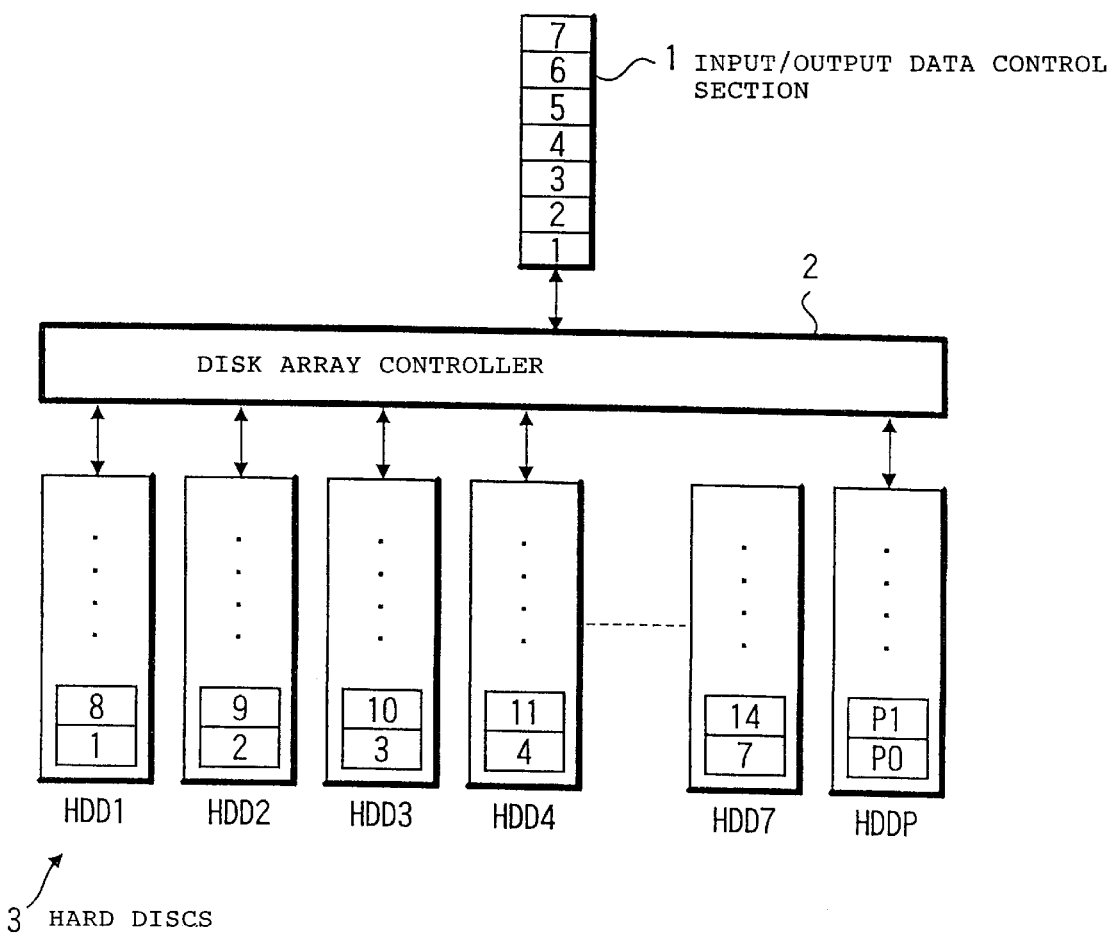
FIG. 1 is a diagram showing the action of a conventional disc array apparatus.
Figure 2:
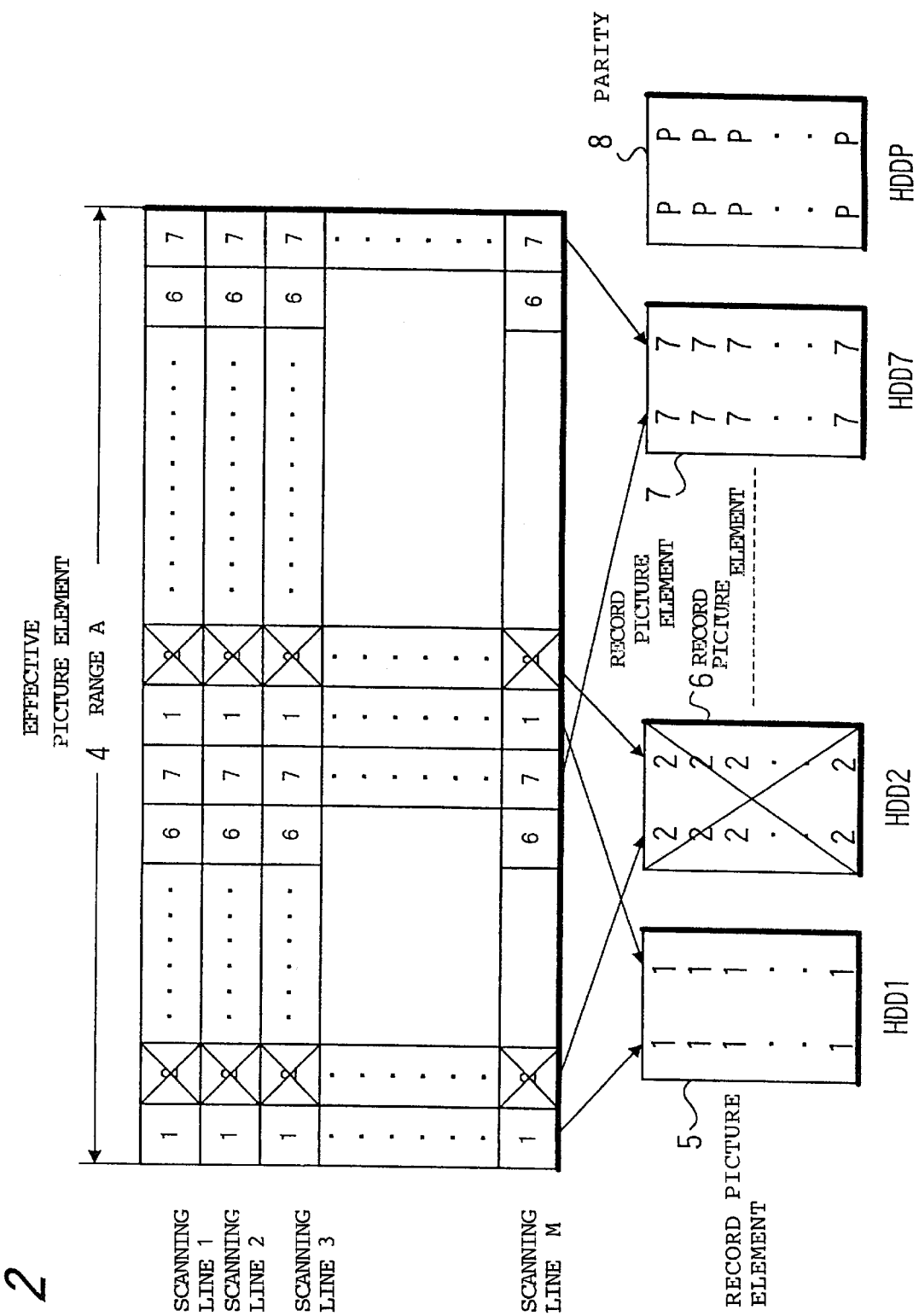
FIG. 2 is a diagram showing the recording action of the conventional disc array apparatus.

The present embodiment will be described below. A picture signal recording and reproducing apparatus of the present embodiment is a recording and reproducing apparatus which dividedly records a picture signal in a plurality of recording media and performs reproduction thereof, wherein supposing a case where a part of the recording media breaks down, the picture signal has previously dividedly been recorded by a picture element control means so that the adjacent picture elements may be recorded in different recording media, and when performing reproduction, enormous picture elements are reproduced, if there is a recording medium in trouble, but the correction of the picture by using the adjacent picture element is easy, since the probability that normal adjacent picture elements exist, is high because of the picture element control means.

First, the arrangement of the present embodiment will be described. A picture signal recording and reproducing apparatus of the present embodiment shown in FIG. 3 corresponds to a video stream server in a video server apparatus. The picture signal recording and reproducing apparatus comprises a processor 9 which performs the conversion and rearrangement of data and performs the transmission of the data, a striping block 13 and a parity generation block 14 and an integration block 15 and a read/write control block 16 composing an RAID (Redundant Arrays Inexpensive Discs) controller performing the processing of write-in and read-out of the data for hard discs; 7 pieces of data hard discs HDD 1 20, HDD 2 25, . . . , HDD 7 30; and 1 parity hard disc (or data hard disc) HDD P 35. The video stream server is called an RAID apparatus. Furthermore, the picture signal recording and reproducing apparatus comprises: FIFOs (First In First Out) 17, 18 and an SPC (SCSI Protocol Controller) 19 and a controller 21 for performing the interface of the data hard disc 20; FIFOs 22, 23 and an SPC 24 and a controller 26 for performing the interface of the data hard disc 25; . . . , FIFOs 27, 28 and an SPC 29 and a controller 31 for performing the interface of the data hard disc 30; FIFOs 32, 33 and an SPC 34 and a controller 36 for performing the interface of the parity hard disc; and a CPU (Central Processing Unit) 37 for managing the control of the read/write control block 16, controllers 21, 26, 31, 36, SPCs 19, 24, 29, 34; a ROM (Read Only Memory) 38 for storing control programs; and an SRAM (Static Random Access Memory) 39 for storing control data.

Here, the processor 9, shown by functional blocks, comprises: a picture element insertion processing block 10 for inserting a dummy picture element into effective picture elements when writing in the data; a picture element deletion processing block 12 for deleting the inserted dummy picture element when reading out the data; and a picture element concealment processing block 11 for processing the picture element in error by concealment processing. Here, a picture element control means is composed of the picture element insertion processing block 10 and the picture element deletion processing block 12.

Furthermore, the striping block 13 has a function to divide the bit stream supplied at the time of recording, into each of the striping units of the first word, the second word, the third word, the fourth word, the fifth word, the sixth word, and the seventh word at every 1 byte (=8 bits) unit. The reason why the bit stream is divided into 1 word like this is that since 1 picture element is composed of 8 bits and 8 bits correspond to 1 word, the bit stream should be striped by the word corresponding to the picture element data. The parity generation block 14 has a function to generate 8 bits of parity data corresponding to 56 bits of bit stream divided into the first word to the seventh word, by calculating the exclusive-OR of 7 bit data composed of the head bit, the second bit, the third bit, the fourth bit, the fifth bit, the sixth bit, and the seventh bit of each word divided into each striping unit at the time of recording. The integration block has a function to integrate the first word to the seventh word so that the data read out of the data hard discs at the time of reproducing may be in an order of bit stream.

The read/write control block 16 has a function to record the first word in the HDD 1 and process the first word to be reproduced from the HDD 1, and to record the second word in the HDD 2 and process the second word to be reproduced from the HDD 2, and to record the third word in the HDD 3 and process the third word to be reproduced from the HDD 3, and to record the fourth word in the HDD 4 and process the fourth word to be reproduced from the HDD 4, and to record the fifth word in the HDD 5 and process the fifth word to be reproduced from the HDD 5, and to record the sixth word in the HDD 6 and process the sixth word to be reproduced from the HDD 6, and to record the seventh word in the HDD 7 and process the seventh word to be reproduced from the HDD 7.

The FIFO 17 has a function to store the first word to be recorded in the HDD 1, and the FIFO 18 has a function to store the first word reproduced from the HDD 1. The SPC 1 19 has a function to control the communication protocol of the SCSI interface with the HDD 1. The controller 21 has a function to control the actions of the FIFOs 17, 18 and the SPC 1. The FIFO 22 has a function to store the second word to be recorded in the HDD 2, and the FIFO 23 has a function to store the second word reproduced from the HDD 2. The SPC 2 24 has a function to control the communication protocol of the SCSI interface with the HDD 2. The controller 26 has a function to control the actions of the FIFOs 22, 23 and the SPC 2. The FIFO 27 has a function to store the seventh word to be recorded in the HDD 7, and the FIFO 28 has a function to store the seventh word reproduced from the HDD 7. The SPC 7 29 has a function to control the communication protocol of the SCSI interface with the HDD 7. The controller 31 has a function to control the actions of the FIFOs 27, 28 and the SPC 7 29. The FIFO 32 has a function to store 8 bits of parity data to be recorded in the HDD P, and the FIFO 33 has a function to store 8 bits of parity data reproduced from the HDD P. The SPC P 24 has a function to control the communication protocol of the SCSI interface with the HDD P. The controller 36 has a function to control the actions of the FIFOs 32, 33 and the SPC P 34.

The 7 pieces of data hard discs HDD 1 20, HDD 2 25, . . . HDD 7 30 have the function to store the first word, the second word, the third word, the fourth word, the fifth word, the sixth word, and the seventh word. The 1 parity hard disc (or data hard disc) HDD P 35 has a function to store 8 bits of parity data.

Furthermore, the CPU 37, the ROM 38, the SRAM 39, and the striping block 13 and the parity generation block 14 and the integration block and the read/write control block 16, shown by functional blocks, have a write-in control section for controlling the write-in of the data and a read-out control section for controlling the read-out of the data. The write-in control section controls the write-in of the data to the hard disc. The read-out control section controls the read-out of the data form the hard disc. Here, a write-in control means and read-out control means are composed of the write-in control section and the read-out control section.

Furthermore, the arrangement of the picture element insertion processing block will be described on the basis of FIG. 4. By the way, here, the description will be given as for the picture element, wherein as mentioned above, 1 picture element is composed of 8 bits and 8 bits correspond to 1 word. The picture element insertion processing block, shown by functional blocks, has an effective picture element extraction section 40 for extracting the effective picture elements in the horizontal direction of the picture signal data to be written in; a dummy picture element insertion section 43 for inserting a dummy picture element in which 1 picture element is 8 bit unit, to the effective picture element; and a scanning line counter 44 for counting the number of scanning lines from the scanning line 1 to the scanning line M in the vertical direction in order. The effective picture element extraction section 40 has a start picture element detection section 41 for detecting the start picture element of the effective picture element in the horizontal direction in each scanning line; and an effective picture element counter 42 for counting the number of effective picture elements.

Furthermore, the arrangement of the picture element deletion processing block will be described on the basis of FIG. 5. By the way, here, the description will be given as for the picture element, wherein as mentioned above, 1 picture element is composed of 8 bits and 8 bits correspond to 1 word. The picture element deletion processing block, shown by functional blocks, has an effective picture element extraction section 45 for extracting the effective picture elements in the horizontal direction of the read out picture signal data; an auxiliary signal adding section 48 for adding an auxiliary signal for transmission to the effective picture elements in the horizontal direction of the read out picture signal data; a dummy picture element deletion section 49 for deleting the dummy picture element in which 1 picture element is 8 bit unit, inserted into the effective picture elements in the horizontal direction of the read out picture signal data; and a scanning line counter 50 for counting the number of scanning lines from the scanning line 1 to the scanning line M in the vertical direction in order. The effective picture element extraction section 45 has a start picture element detection section 46 for detecting the start picture element of the effective picture elements in the horizontal direction in each scanning line; and an effective picture element counter 47 for counting the number of effective picture elements.

Figure 6:
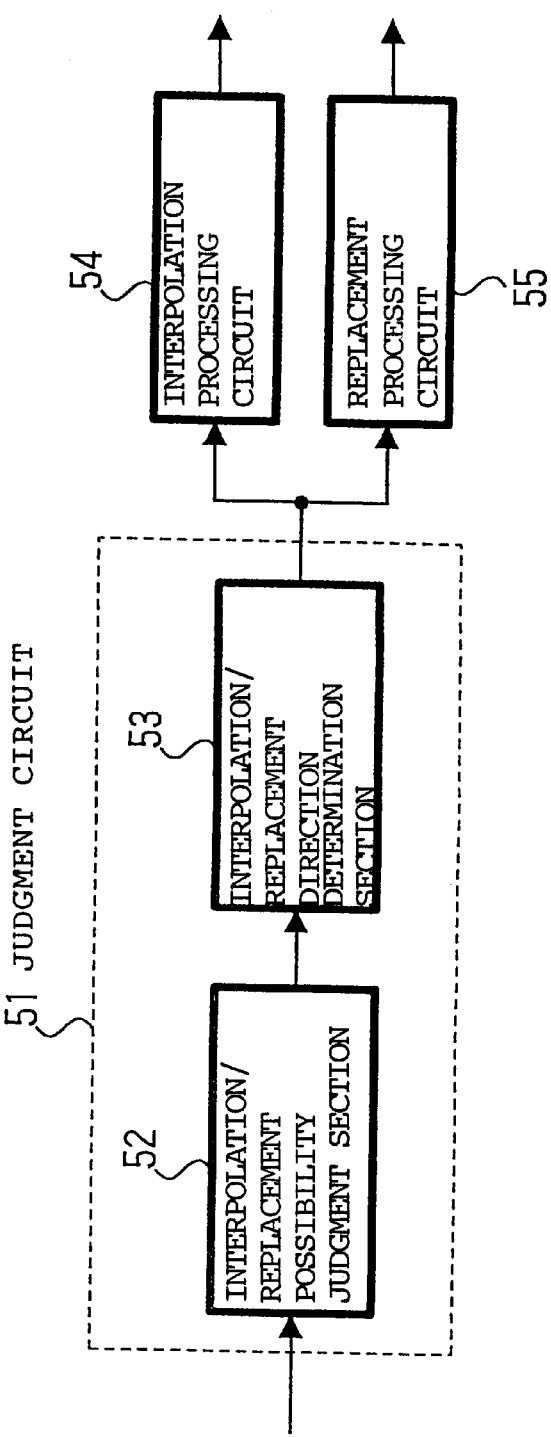
FIG. 6 is a functional block diagram of the picture element concealment processing block of the picture signal recording and reproducing apparatus of the present embodiment.

Furthermore, the arrangement of the picture element concealment processing block will be described on the basis of FIG. 6. By the way, here, the description will be given as for the word, wherein as mentioned above, 1 picture element is composed of 8 bits and 8 bits correspond to 1 word. The picture element concealment processing block has a judgment circuit 51 for judging the possibility of interpolation and replacement from the error flag at the time of the data read-out to be described later of 8 points around an object picture element and the ideal direction found by the calculation among the horizontal direction, the vertical direction, the diagonally up to the left direction, and the diagonally up to the right direction; an interpolation processing circuit 54 for performing interpolation between 2 points in the vertical direction when both the upper and lower 2 points of the object picture element have no error; and a replacement processing circuit 55 for performing replacement, when either of the diagonally upper and lower 2 points of the object picture element has no error, simply by the either. The judgment circuit 51 has an interpolation/replacement possibility judgment section 52 which preferentially judges the possibility of interpolation and judges the possibility of replacement when interpolation is not possible; and an interpolation/replacement direction determining section 53 which preferentially judges either of the ideal directions and determines another direction when the ideal directions are not possible.

Next, the arrangement of the write-in control section will be described on the basis of FIG. 7. By the way, here, the description will be given as for the word, wherein as mentioned above, 1 picture element is composed of 8 bits and 8 bits correspond to 1 word. The write-in control section, when shown by the functional blocks, has a data dividing means 56; a striping unit write-in means 57; a parity write-in means 58; and a write-in error detection means 59. The data dividing means 56 divides an input data into specified units, for example, striping units of 8 bits expressing 1 picture element. The data dividing means 56 corresponds to the striping block 13 which divides the bit stream supplied at the time of recording into each of the striping units of the first word, the second word, the third word, the fourth word, the fifth word, the sixth word, and the seventh word for every 1 byte (=8 bits) unit. The striping unit is a group of segment data dispersedly accumulated in a plurality of data hard discs. The reason why they are dispersedly accumulated is that by dispersedly accumulating them in a plurality of data hard discs, the number of users who use the same picture at the same time can be made to be large. As the way of dispersed accumulation, there are a random layout and a striping layout. The random layout is suitable for the accumulation of multi-rate pictures, and the striping layout is characterized in that the use efficiency of the disc is high. The segment data dispersedly accumulated by the striping layout are called the striping unit.

The striping unit write-in means 57 performs the action of write-in so that the striping units may be dispersedly accumulated in a plurality of data hard discs. The action of write-in is performed on the basis of the SCSI command supplied from the processor 9. The striping unit write-in means 57 corresponds to the read/write control block 16 which performs processing so as to record the first word in the HDD 1, and performs processing so as to record the second word in the HDD 2, and performs processing so as to record the third word in the HDD 3, and performs processing so as to record the fourth word in the HDD 4, and performs processing so as to record the fifth word in the HDD 5, and performs processing so as to record the sixth word in the HDD 6, and performs processing so as to record the seventh word in the HDD 7.

The parity write-in means 58 writes the exclusive-OR (exclusive logical add) of the data written in the data hard discs, into the parity hard disc. This action of write-in is also performed on the basis of the SCSI command supplied from the processor 9. The parity write-in means 58 corresponds to the parity generation block 14 which generates the parity data of 8 bits, corresponding to the bit stream of 56 bits divided into the first word to the seventh word, by calculating the exclusive-OR of the 7 bit data composed of the head bit, the second bit, the third bit, the fourth bit, the fifth bit, the sixth bit, and the seventh bit of each word divided into each striping unit at the time of recording. When the parity hard disc is not provided and all are data hard discs, for example, the parity is calculated at every striping unit and then written in all data hard discs.

The write-in error detection means 59 detects an error of write-in of the data for 7 pieces of data hard discs HDD 1 20, HDD 2 25, . . . HDD 7 30, and HDD P 35. The action of error detection is performed by detecting that an error flag is set up by the status signal for the SCSI command. The write-in error detection means 59 corresponds to the CPU 37 which detects that an error flag is set up by the status signal for the SCSI command of write of the controllers 21, 26, . . . 31, 36,the SPC 1 19, the SPC 2 25, . . . the SPC 7 29, and the SPC P 34.

Thus, the write-in control section divides the picture signal data into striping units and dispersedly records them in a plurality of hard discs, for the write-in request from a host computer. Furthermore, it performs a calculation of the parity of the striping units and writes the parity in the parity hard disc or the data hard disc. When there is a write-in error, an error flag is set up.

Next, the arrangement of the read-out control section will be described on the basis of FIG. 8. By the way, here, the description will be given as for the word, wherein as mentioned above, 1 picture element is composed of 8 bits and 8 bits correspond to 1 word. The read-out control section, when shown by the functional blocks, has a striping unit read-out means 60; a read-out error detection means 61; a striping unit restoration means 62; and a data composition means 63.

The striping unit read-out means 60 performs the read-out action of the striping units dispersedly accumulated in a plurality of data hard discs. The read-out action is performed on the basis of the SCSI command supplied from the processor 1. The striping unit read-out means 60 corresponds to the read/write control block 16 which performs processing so as to reproduce the first word from the HDD 1, and performs processing so as to reproduce the second word from the HDD 2, and performs processing so as to reproduce the third word from the HDD 3, and performs processing so as to reproduce the fourth word from the HDD 4, and performs processing so as to reproduce the fifth word from the HDD 5, and performs processing so as to reproduce the sixth word from the HDD 6, and performs processing so as to reproduce the seventh word from the HDD 7. The read-out error detection means 61 detects an error of the data read-out for a plurality of data hard discs. The action of error detection is performed by detecting the status signal for the SCSI command. The read-out error detection means 61 corresponds to the CPU 37 which detects that an error flag is set up by the status signal for the SCSI command of read of the controllers 21, 26, . . . 31, 36, the SPC 1 19, the SPC 2 25, . . . the SPC 7 29, and the SPC P 34.

The striping unit restoration means 62 restores the striping unit in which an error occurs on the basis of a parity calculation. The striping unit restoration means 62 corresponds to the read/write control block 16 which performs processing so as to newly generate the word of 8 bits having a read-out error detected, by 8 times repeating the calculation of the exclusive-OR of 7 bits composed of each of the words except for the word having a read-out error detected and the parity bit of 8 bits. The data composition means 63 composes the original data from the data divided in the striping units. Consequently, the composed data are transmitted. The data composition means 63 corresponds to the integration block 15 which integrates the first word to the seventh word so that the data read out from the data hard discs at the time of reproduction may be in an order of the bit stream.

Furthermore, the striping unit restoration means 62 described above, performs restoration of the striping unit when a read-out error is detected in the read-out error detection means 61, but when no read-out error is detected in the read-out error detection means 61, the parity data of 8 bits are newly generated by calculating the exclusive-OR of each bit of the first word to the seventh word in the read/write control block 16. Then, in the read/write control block 16, the parity data read out from the HDD P 35 and the newly generated parity data are compared, and when the result of comparison is coincident, each of 7 pieces of words is judged to be normal and is supplied to the integration block. On the other hand, when the result of comparison is discordant, an error flag indicating that the data are incomplete is added to the data of 7 bits and the data are supplied to the integration block 15.

Thus, the read-out control section reads out the striping units for the request of read-out from the host computer, and reconstructs them to the original data and returns them to the host computer. Then, when an error occurs, after restoring the striping units by a parity calculation, it reconstructs them to the original data and returns them to the host computer.

Figure 3:
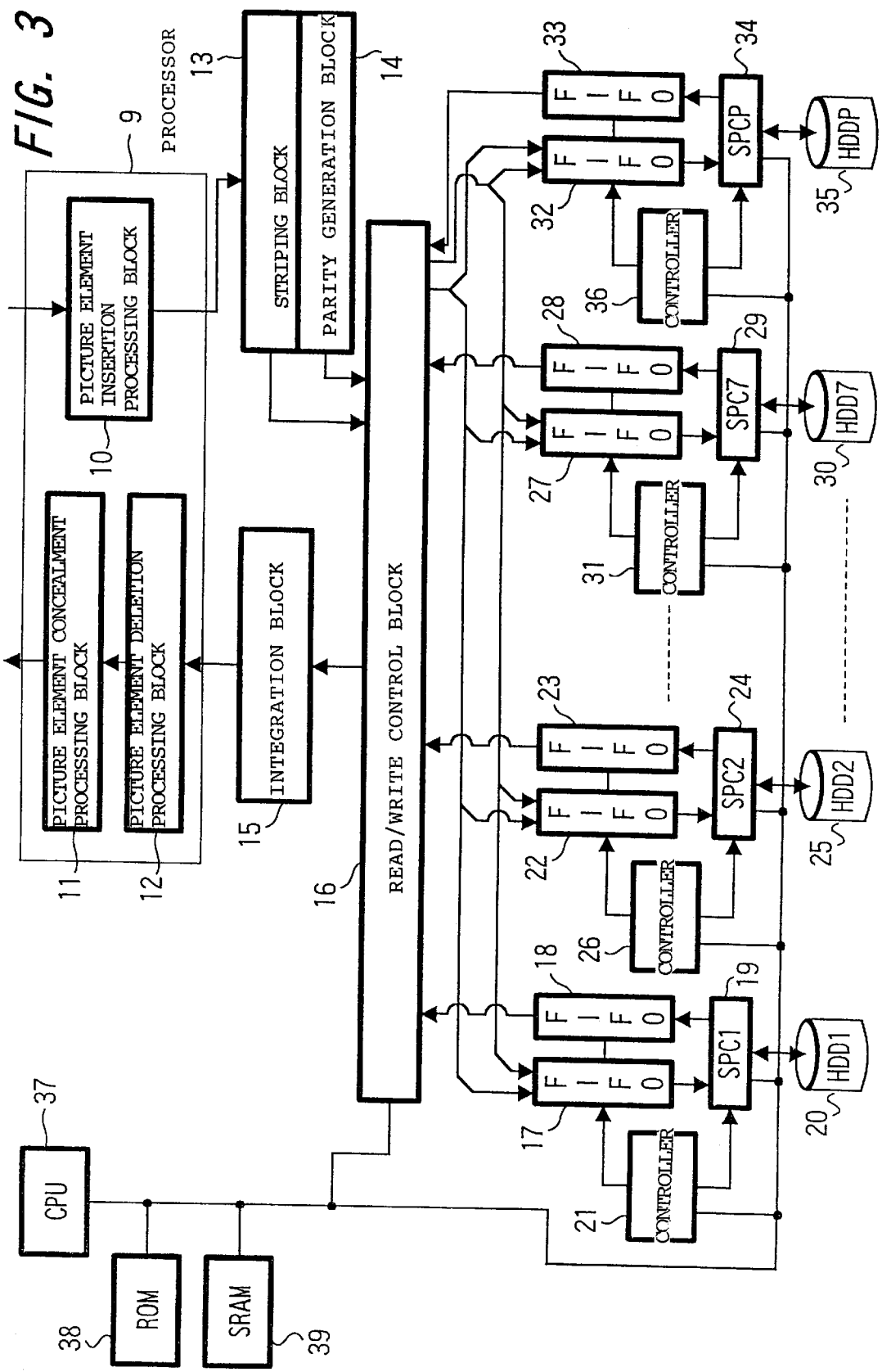
FIG. 3 is a block diagram showing the arrangement of a picture signal recording and reproducing apparatus of according to the present embodiment.

The action of the picture signal recording and reproducing apparatus according to the present embodiment arranged like this, will be described by referring to the block diagram in FIG. 3, the block diagrams in FIG. 4 to FIG. 8, and the explanation diagram of the recording action in FIG. 9. By the way, here, the description will be given as for the picture element, wherein as mentioned above, 1 picture element is composed of 8 bits and 8 bits correspond to 1 word. FIG. 9 is an explanation diagram of recording action in a case where a picture signal with the number A of effective picture elements per the horizontal scanning line and the number M of scanning lines per 1 frame, is divided and recorded in 7 sets of data hard discs. In FIG. 9, each square shows 8 bits expressing 1 picture element of each picture signal, and the numerals 1 to 7 therein show the numbers (HDD 1 to HDD 7) of the data hard discs in which the data are recorded.

First, the action of write-in will be described while referring to FIG. 3, FIG. 4, FIG. 5, FIG. 6, FIG. 7, and FIG. 9. When a request of write-in is made from the host computer, a command and picture signal data are supplied to the processor 9 shown in FIG. 3. The processor 9 converts the supplied command to the SCSI command. The picture signal data are subjected to formatting in digital by D1 or D2 format. The processor 9 divides the SCSI command subjected to conversion processing like this and the picture signal data by phase respectively, and supplies them to the picture element insertion processing block 10.

Figure 4:
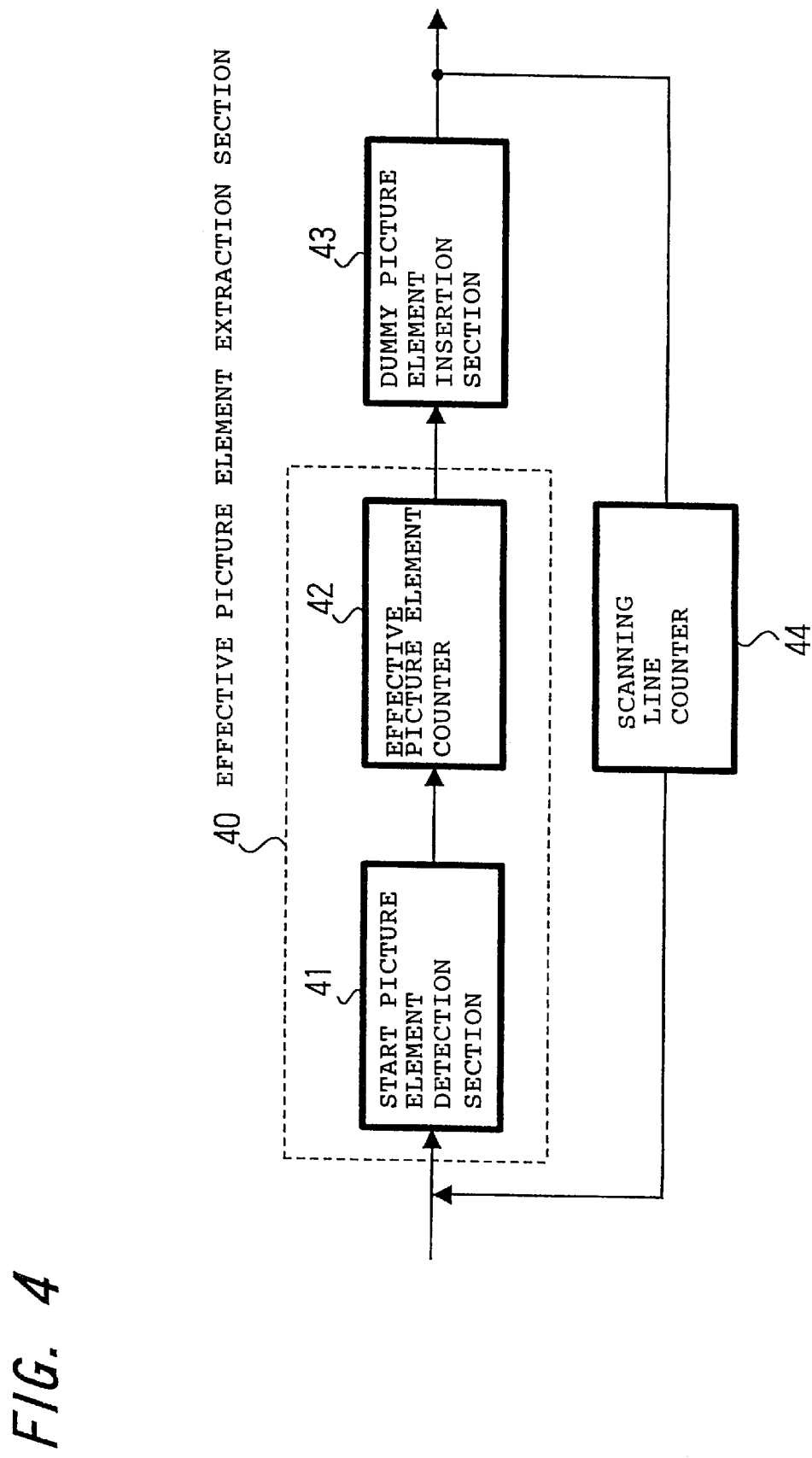
FIG. 4 is a functional block diagram of the picture element insertion processing block of the picture signal recording and reproducing apparatus of the present embodiment.

As shown in FIG. 4, in the picture element insertion processing block 10, the dummy picture element is inserted into the effective picture elements. By the way, here, the description will be given as for the picture element, wherein as mentioned above, 1 picture element is composed of 8 bits and 8 bits correspond to 1 word. That is, in the picture element insertion processing block 10, the effective picture elements in the horizontal direction of the picture signal data are extracted at every scanning line in the effective picture element extraction section 40. Specifically, at the start picture element detection section 41, a picture element [1] at the left end of the scanning line 1 as the start picture element of the picture frame shown in FIG. 9, is detected. The detected start picture element [1] is supplied to the effective picture element counter 42. At the effective picture element counter 42, the number A of effective picture elements in the horizontal direction determined in advance in the effective picture element range 65 (A) has previously been preset, and the horizontal scanning clock (not shown in the figure) is counted up to the picture elements 1, 2, . . . , 6, 7, 1, 2, . . . , 6, 7, and when the counted value coincides with the preset value A, the count is finished and a coincidence signal is outputted. The coincidence signal is supplied to the dummy picture element insertion section 43. By the effective picture element extraction section 40, the number A of effective picture elements in the effective picture element range 65 shown in FIG. 9, is extracted. At the dummy picture element insertion section 43, the picture elements [1], [2] shown by a dummy picture element 66 in which 1 picture element is expressed by 8 bits, are inserted into the effective picture element range 65 (A) in the horizontal direction of the scanning line 1.

When the dummy picture element is inserted, the output signal thereof is supplied to the scanning line counter 44. The number M of scanning lines has been preset in advance at the scanning line counter 44, and the vertical scanning clock (not shown in the figure) 1 is counted and a discordance signal is outputted. The discordance signal is supplied to the start picture element detection section 41. At the start picture element detection section 41, a picture element [3] at the left end of the scanning line 2 as the start picture element of the picture frame shown in FIG. 9, is detected. The detected start picture element [3] is supplied to the effective picture element counter 42. At the effective picture element counter 42, the horizontal-scanning clock (not shown in the figure) is counted up to the picture elements 3, 4, . . . , 1, 2, 3, 4, . . . , 1,2, and if the counted value coincides with the preset value, the count is finished and a coincidence signal is outputted. The coincidence signal is supplied to the dummy picture element insertion section 43. By the effective picture element extraction section 40, the number A of effective picture elements in the effective picture element range 65 shown in FIG. 9, is extracted. At the dummy picture element insertion section 43, the picture elements [3], [4] shown by the dummy picture element 66 in which 1 picture element is expressed by 8 bits, are inserted into the effective picture element range 65 (A) in the horizontal direction of the scanning line 2. When the dummy picture element is inserted, the output signal thereof is supplied to the scanning line counter 44.

At the scanning line counter 44, the vertical scanning clock 2 (not shown in the figure) is counted and a discordance signal is outputted. The discordance signal is supplied to the start picture element detection section 41. At the start picture element detection section 41, a picture element [5] at the left end of the scanning line 3 as the start picture element of the picture frame shown in FIG. 9, is detected. The detected start picture element [5] is supplied to the effective picture element counter 42. At the effective picture element counter 42, the horizontal scanning clock (not shown in the figure) is counted up to the picture elements 5, 6, . . . , 3, 4, 5, 6, . . . 3, 4, and if the counted value coincides with the preset value, the count is finished and a coincidence signal is outputted. The coincidence signal is supplied to the dummy picture element insertion section 43. By the effective picture element extraction section 40, the number A of effective picture elements in the effective picture element range 65 shown in FIG. 9, is extracted. At the dummy picture element insertion section 43, the picture elements [5], [6] shown by the dummy picture element 66 in which 1 picture element is expressed by 8 bits, are inserted into the effective picture element range 65 (A) in the horizontal direction of the scanning line 3. When the dummy picture element is inserted, the output signal thereof is supplied to the scanning line counter 44.

After that, the repetition is performed in order, and at the scanning line counter 44, the vertical scanning clock M-1 (not shown in the figure) is counted and a discordance signal is outputted. The discordance signal is supplied to the start picture element detection section 41. At the start picture element detection section 41, a picture element [6] at the left end of the scanning line M as the start picture element of the picture frame shown in FIG. 9, is detected. The detected start picture element [6] is supplied to the effective picture element counter 42. At the effective picture element counter 42, the horizontal scanning clock (not shown in the figure) is counted up to the picture elements 6, 7, . . . , 4, 5, 6, 7, . . . , 4, 5, and if the counted value coincides with the preset value, the count is finished and a coincidence signal is outputted. The coincidence signal is supplied to the dummy picture element insertion section 43. By the effective picture element extraction section 40, the effective picture element A in the effective picture element range 65 shown in FIG. 9, is extracted. At the dummy picture element insertion section 43, the picture elements [6], [7] shown by the dummy picture element 66 in which 1 picture element is expressed by 8 bits, are inserted to the effective picture element range 65 (A) in the horizontal direction of the scanning line M. When the dummy picture element is inserted, the output signal thereof is supplied to the scanning line counter 44.

At the scanning line counter 44, the vertical scanning clock M (not shown in the figure) is counted, and is counted up to the scanning lines 1, 2, . . . , M, and if the counted value coincides with the preset value, the count is finished and a coincidence signal is outputted. The coincidence signal is supplied to the start picture element detection section 41. By this, the action in this frame at the start picture element detection section 41, comes to an end. After that, the action moves to an action of the next frame. Thus, the insertion action of the dummy picture element of each frame is performed in order. The picture element data of the picture signal into which the dummy picture element is inserted, is supplied to the write-in control section.

The write-in control section generates a file system for writing in the picture data. That is, it makes a file system to determine which block size of which picture data should be transferred to which block address. The write-in action of the write-in control section like this will be described according the functional block diagram of the write-in control section shown in FIG. 7. By the way, here, the description will be given as for the word, wherein as mentioned above, 1 picture element is composed of 8 bits and 8 bits correspond to 1 word.

Figure 7:
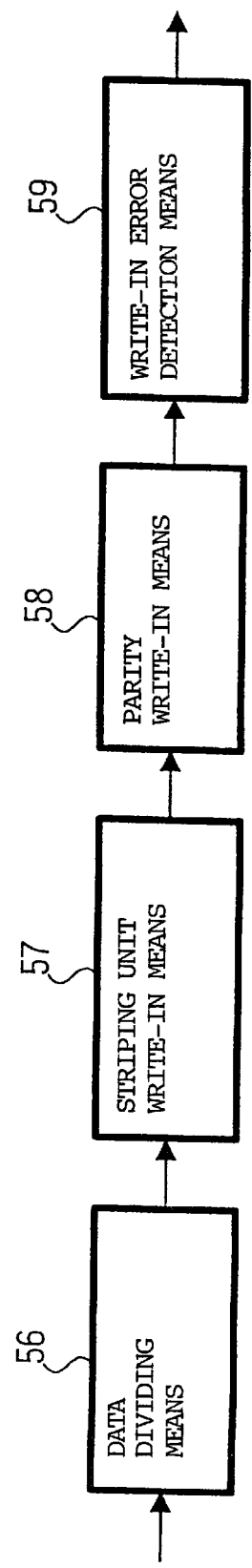
FIG. 7 is a functional block diagram of the write-in control section of the picture signal recording and reproducing apparatus of the present embodiment.

In FIG. 7, after starting the write-in action, the data dividing means 56 divides the data into the striping unit. The striping unit is made to be a specified unit, but it may also be a unit of byte, a unit of bit, or a unit of sector, and here, for example, it made to be 1 word (8 bits), which is a unit for write-in. The reason why the bit stream is divided into 1 word like this, is that since 1 picture element is composed of 8 bits and 8 bits correspond to 1 word, the bit stream should be striped by a unit of 1 word corresponding to the picture element data. Specifically, the data dividing means 56 acts to divide the bit stream supplied at the time of recording, by the striping block 13 into each of the striping units of the first word, the second word, the third word, the fourth word, the fifth word, the sixth word, and the seventh word at every 1 byte (=8 bits) unit.

Next, the striping unit write-in means 57 writes the striping units in the data hard discs. In that case, the write-in action is performed so that the striping units may dispersedly be accumulated in 7 pieces of data hard discs. The write-in action is performed on the basis of the SCSI command supplied from the processor 9. Specifically, by the read/write control block 16, the striping unit write-in means 57 processes the first word to be recorded in the HDD 1, and processes the second word to be recorded in the HDD 2, and processes the third word to be recorded in the HDD 3, and processes the fourth word to be recorded in the HDD 4, and processes the fifth word to be recorded in the HDD 5, and processes the sixth word to be recorded in the HDD 6, and processes the seventh word to be recorded in the HDD 7.

The parity write-in means 58 writes the exclusive-OR (exclusive logical add) of the data written in the data hard discs, in the parity hard disc. This write-in action is also performed on the basis of the SCSI command supplied from the processor 9. Specifically, by the parity generation block 14, the parity write-in means 58 generates the parity data of 8 bits corresponding to the bit stream of 56 bits divided into the first word to the seventh word, by calculating the exclusive-OR of the 7 pieces of bit data composed of the head bit, the second bit, the third bit, the fourth bit, the fifth bit, the sixth bit, and the seventh bit of each word divided into each striping unit at the time of recording. When the parity hard disc is not provided and all are data hard discs, for example, it is arranged that the parity is calculate at every striping unit and is written in all data hard discs.

The write-in error detection means 59 judges whether there is an error or not. This action of error detection is performed by detecting the status signal for the SCSI command as for 7 pieces of data hard discs. When there is an error at the write-in error detection means 59, a specified number of times of retries are performed. The retries are set on the basis of the mode parameter for the SCSI command. Furthermore, the judgment that this number of times of retries is overed, is performed by detecting the mode parameter and the status signal.

If the number of times of retries is overed, an error error flag is set up. In that case, the error flag shows the number of the hard disc in which an error has occurred and the sector address in which an error has occurred from the status signal. For example, that the address 2 of the data hard disc HDD 3 is in error, is shown. The error flag is recorded in the SRAM 39.

When there is no error at the write-in error detection means 59, the parity write-in means 58 writes the parity which is the exclusive logical add of the data written in the data hard discs, into the parity hard disc. This write-in action is also performed on the basis of the SCSI command supplied from the processor 9. Furthermore, in a case where no parity hard disc is provided and all are data hard discs, the parity write-in means 58 writes the parity at every striping unit written in the data hard discs by the striping unit write-in means 57, into the data hard discs. Repeating the action like this, the write-in of the material of a series of programs or the like is finished.

By the CPU 37, the write-in error detection means 59 detects data write-in errors for the 7 pieces of data hard discs HDD 1 20, HDD 2 25, . . . HDD 7 30, HDD P 35. This action of error detection is performed by detecting that an error flag is set up by the status signal for the SCSI command. Specifically, by the CPU 37, the write-in error detection means 59 detects that an error flag is set up by the status signal for the SCSI command of write of the controllers 21, 26, . . . 31, 36, SPC 1 19, SPC 2 25, . . . SPC 7 30, SPC P 34.

Here, the FIFO 17 stores the first word to be recorded in the HDD 1, for the interface. The SPC 1 19 controls the communication protocol of the SCSI interface with the HDD 1. The controller 21 controls the action of the FIFOs 17, 18 and the SPC 1. The FIFO 22 stores the second word to be recorded in the HDD 2. The SPC 2 24 controls the communication protocol of the SCSI interface with the HDD 2. The controller 26 controls the actions of the FIFOs 22, 23 and the SPC 2. The FIFO 27 stores the seventh word to be recorded in the HDD 7, for the interface. The SPC 7 29 controls the communication protocol of the SCSI interface with the HDD 7. The controller 31 controls the actions of the FIFOs 27, 28 and the SPC 7 29. The FIFO 32 stores the parity data of 8 bits to be recorded in the HDD P, for the interface. The SPC P 24 controls the communication protocol of the SCSI interface with the HDD P. The controller 36 controls the actions of the FIFOs 32, 33 and the SPC P 34.

In this way, into the 7 pieces of data hard discs HDD 1 20, HDD 2 25, . . . , HDD 7 30, the first word, the second word, the third word, the fourth word, the fifth word, the sixth word, and the seventh word are stored. Furthermore, in one parity hard disc (or a data hard disc) HDD P 35, the parity data of 8 bits are stored.

In FIG. 9, the action to record the picture element data of the picture signal data into which the dummy picture element is inserted, in the hard discs, will be described. By the way, here, the description will be given as for the picture element, wherein as mentioned above, 1 picture element is composed of 8 bits and 8 bits correspond to 1 word. As mentioned above, since the dummy picture element 66 in which 1 picture element is expressed by 8 bits, is inserted into the effective picture elements in the horizontal direction of the picture signal data by the picture element insertion processing block 10, the first picture element line 1, 3, 5, . . . , 6; the second picture element line 2, 4, 6, . . . , 7; . . . ; the seventh picture element line 7, 2, 4, . . . , 5; the eighth picture element line 1, 3, 5, . . . , 6; the ninth picture element line 2, 4, 6, . . . , 7; . . . ; and the fourteenth picture element line 7, 2, 4, . . . , 5 are formed in the vertical direction of the picture signal data.

By the data dividing means 56 of the write-in control section, the data are divided into, for example, the record picture element 68 of 1, 1, 1, . . . , 1; the record picture element 69 of 2, 2, 2, . . . , 2; . . . ; and the record picture element 70 of 7, 7, 7, . . . , 7, and further the picture element lines are divided into the striping units as the write-in unit. The striping unit is, as mentioned above, 1 word (8 bits).

Then, by the striping unit write-in means 57, the striping unit of the first word of the record picture element 68 is written in the HDD 1 of the data hard disc 71, and the striping unit of the second word of the record picture element 69 is written in the HDD 2 of the data hard disc 71, . . . , and the striping unit of the seventh word of the record picture element 70 is written in the HDD 7 of the data hard disc 72. Furthermore, the striping unit of the parity data 71 of 8 bits is written in the HDD P of the parity hard disc 73.

Accordingly, the record picture element 68 is recorded in the HDD 1 of the data hard disc 72, and the record picture element 69 is recorded in the HDD 2 of the data hard disc 72, and the record picture element 70 is recorded in the HDD 7 of the data hard disc 72. Furthermore, the parity data 71 is recorded in the HDD P of the parity hard disc 73.

In short, by inserting the dummy picture element 66 in which 1 picture element is expressed by 8 bits, into the effective picture elements in the horizontal direction of the picture signal data, the picture element data different in the vertical direction can be arranged in the vertical direction, as shown by the first picture element line 1, 3, 5, . . . , 6; the second picture element line 2, 4, 6, . . . , 7; and the seventh picture element line 7, 2, 4, . . . , 5, so that the adjacent picture elements in the vertical direction can be stored in different data hard discs. Therefore, even when either of the HDD 1, HDD 2, . . . , HDD 7 of the data hard disc 72 breaks down, it does not occur that all the line of the upper and lower picture element data become continuously in error.

Next, the read-out action will be described with referring to FIG. 3, FIG. 4, FIG. 5, FIG. 6, FIG. 8, and FIG. 9. When a read-out request is made from the host computer, a command is supplied to the processor 9 shown in FIG. 3. The processor 9 converts the supplied command to the SCSI command. The processor 1 supplies the SCSI command subjected to conversion processing like this to the read-out control section.

The read-out control section generates a file system to read out the picture data. That is, a file system to determine which block size of which picture data should be transferred from which block address, is made. The read-out action of the read-out control section like this will be described according to the functional block diagram of the read-out control section shown in FIG. 8. By the way, here, the description will be given as for the word, wherein as mentioned above, 1 picture element is composed of 8 bits and 8 bits correspond to 1 word.

Figure 8:
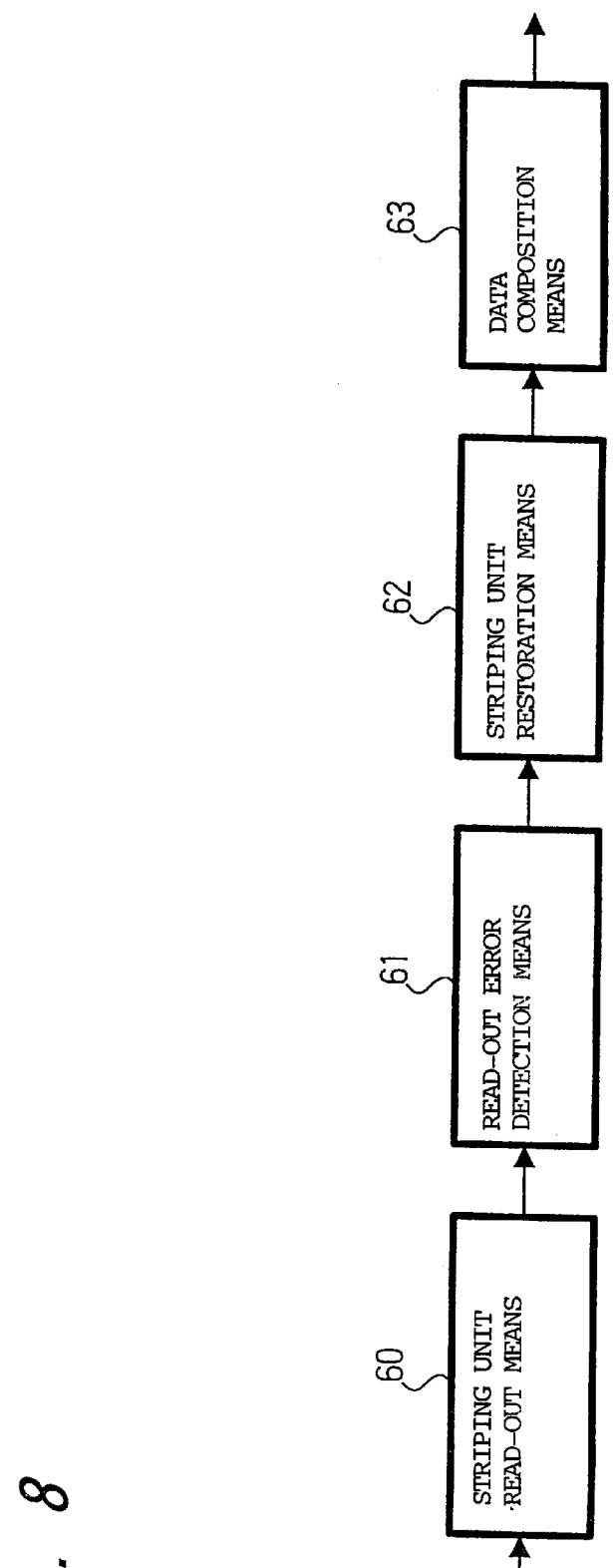
FIG. 8 is a functional block diagram of the read-out control section of the picture signal recording and reproducing apparatus of the present embodiment.
Figure 9:
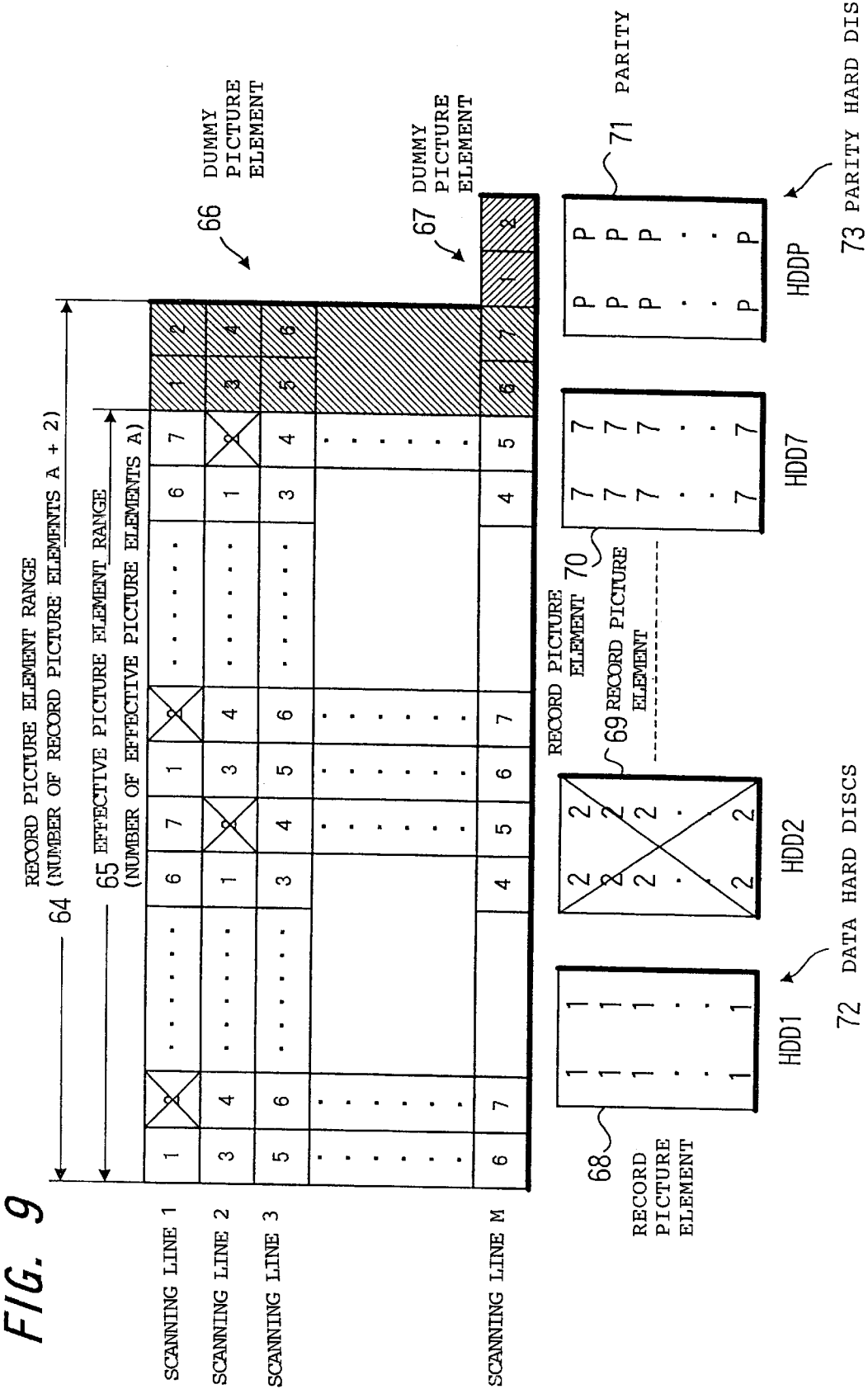
FIG. 9 is a diagram showing the recording action of the picture signal recording and reproducing apparatus of the present embodiment.

In FIG. 8, after starting the read-out action, the striping unit read-out means 60 performs the read-out action of the striping units dispersedly accumulated in a plurality of data hard discs. This read-out action is performed on the basis of the SCSI command supplied from the processor 9.

Specifically, by the read/write control block 16, the striping unit read-out means 60 performs processing so as to reproduce the first word from the HDD 1, and performs processing so as to reproduce the second word from the HDD 2, and performs processing so as to reproduce the third word from the HDD 3, and performs processing so as to reproduce the fourth word from the HDD 4, and performs processing so as to reproduce the fifth word from the HDD 5, and performs processing so as to reproduce the sixth word from the HDD 6, and performs processing so as to reproduce the seventh word from the HDD 7. The read-out error detection means 61 judges whether there is an error in the data read-out for 7 pieces of data hard discs or not. This action of error detection is performed by detecting the status signal for the SCSI command. When an error is detected by the read-out error detection means 61, retries are performed a specified number of times. The number of times of retries is set on the basis of the mode parameter for the SCSI command.

Here, the FIFO 18 stores the first word reproduced from the HDD 1 for the interface. The SPC 1 19 controls the communication protocol of the SCSI interface with the HDD 1. The controller 21 controls the actions of the FIFOs 17, 18 and the SPC 1. The FIFO 23 stores the second word reproduced from the HDD 2 for the interface. The SPC 2 24 controls the communication protocol of the SCSI interface with the HDD 2. The controller 26 controls the actions of the FIFOs 22, 23 and the SPC 2. The FIFO 28 stores the seventh word reproduced from the HDD 7 for the interface. The SPC 7 29 controls the communication protocol of the SCSI interface with the HDD 7. The controller 31 controls the actions of the FIFOs 27, 28 and the SPC 7 29. The FIFO 33 stores the parity of 8 bits reproduced from the HDD P for the interface. The SPC 24 controls the communication protocol of the SCSI interface with the HDD P. The controller 36 controls the actions of the FIFOs 32, 33 and the SPC P 34.

In this way, from the 7 pieces of data hard discs HDD 1 20, HDD 2 25, . . . , HDD 7 30, the first word, the second word, the third word, the fourth word, the fifth word, the sixth word, and the seventh word are reproduced. Furthermore, from one parity hard disc (or one data hard disc) HDD P 35, the parity data of 8 bits are reproduced.

If the number of times of retries is overed, an error error flag is set up. In this case, the error flag shows the number of the hard disc in which an error occurs and the sector address in which an error occurs from the status signal. For example, that the address 2 of the data hard disc HDD 3 is in error, is shown. The error flag is recorded in the SRAM 39. Specifically, the read-out error detection means 61 detects, with the CPU 37, that an error flag is set up by the status signal for the SCSI command of read of the controllers 21, 26, . . . 31, 36, the SPC 1 19, the SPC 2 24, . . . the SPC 7 29, and the SPC P 34.

When the number of times of retries is overed, an error flag is set up on the basis of the status signal and the number of the hard disc in which an error occurs and the sector address in which an error occurs are stored in the SRAM 39. The striping unit restoration means 62 restores the striping unit in which an error occurs on the basis of the parity calculation. Specifically, by repeating 8 times the calculation of the exclusive-OR of 7 bits composed of each word except for the word in which a read-out error is detected and the parity bit of 8 bits, by the read/write control block 16, the striping unit restoration means 62 performs processing so that the word of 8 bits in which a read-out error is detected may newly be generated.

Furthermore, the above mentioned action in the striping unit restoration means 62 is an action to restore the striping unit when a read-out error is detected in the read-out error detection means 61, but when no read-out error is detected in the read-out error detection means 61, by calculating the exclusive-OR of each bit of the first word to the seventh word in the read/write control block 16, the parity data of 8 bits are newly generated. Then, in the read/write control block 16, the parity data read out from the HHD P 35 and the newly generated parity data are compared, and if the result of comparison is coincident, each of 7 pieces of words is judged to be normal and is supplied to the integration block 15. On the other hand, when the result of comparison is discordant, an error flag showing that the data is incomplete, is added to the data of 7 bits, and the data is supplied to the integration block 15.

The data composition means 63 composes the original data from the data divided into striping units. Consequently, the composed data are transmitted. Specifically, the data composition means 63 integrates, by the integration block 15, the first word to the seventh word so that the data read out from the data hard discs at the time of reproduction may be in the order of bit stream. The composed data are supplied to the picture deletion processing block 12.

Figure 5:
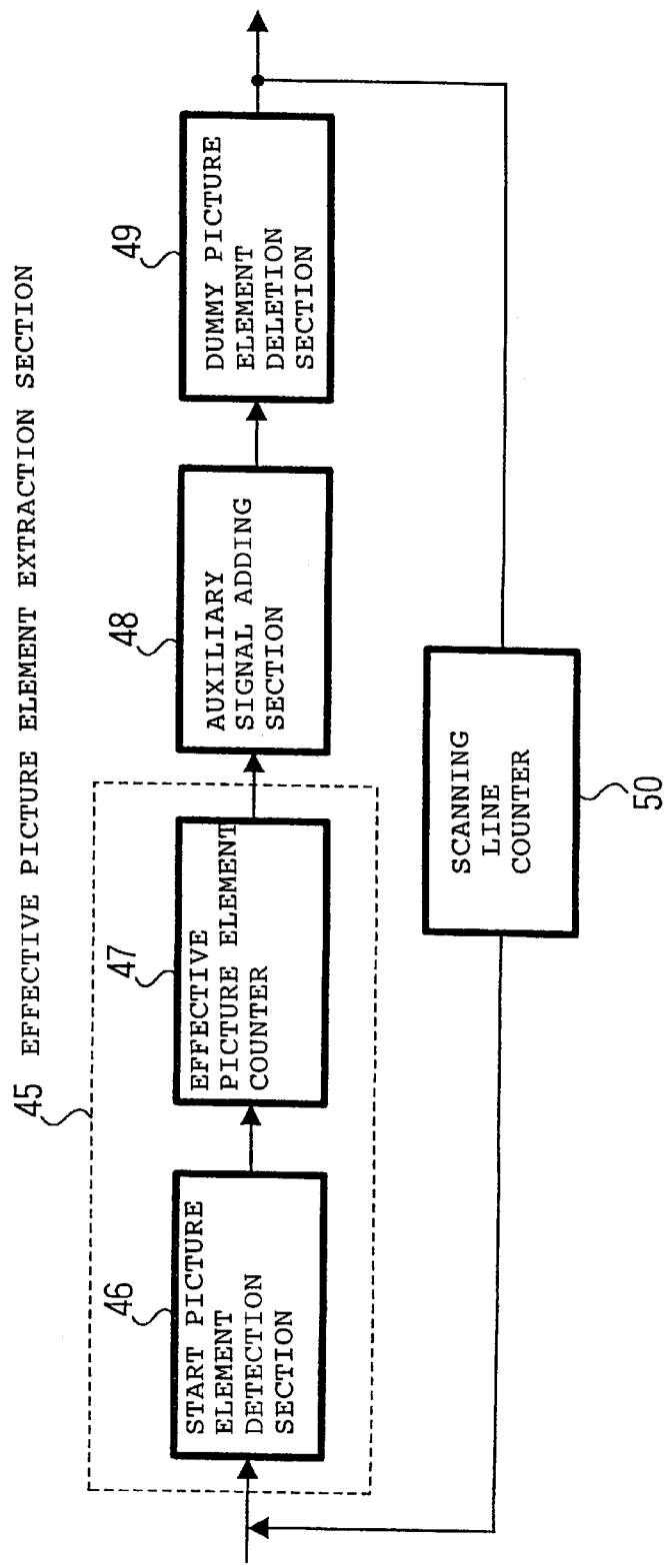
FIG. 5 is a functional block diagram of the picture element deletion processing block of the picture signal recording and reproducing apparatus of the present embodiment.

As shown in FIG. 5, at the picture element deletion processing block, the dummy picture element is deleted for the effective picture elements. By the way, here, the description will be given as for the picture element, wherein as mentioned above, 1 picture element is composed of 8 bits and 8 bits correspond to 1 word. That is, in the picture element deletion processing block, the effective picture elements in the horizontal direction of the picture signal data are extracted at every scanning line at the effective picture element extraction section 45. Specifically, at the start picture element detection section 46, the picture element [1] at the left end of the scanning line 1 as the start picture element of the picture frame shown in FIG. 9, is detected. The detected start picture element [1] is supplied to the effective picture element counter 47. At the effective picture element counter 47, the number of effective picture elements in the horizontal direction determined by the number A of effective picture elements in the effective picture element range 65 has been preset in advance, and the horizontal scanning clock not shown in the figure is counted up to 1, 2, . . . , 6, 7, 1, 2, . . . , 6, 7, and when the counted value coincides with the preset value, the count comes to an end and a coincidence signal is outputted. The coincidence signal is supplied to the auxiliary signal adding section 48. At the auxiliary signal adding section 48, the auxiliary signal data such as a header signal having a synchronization signal or the like related to transmission are added to the effective picture element data. The effective picture element data to which the auxiliary signal data are added, are supplied to the dummy picture element deletion section 49. By the effective picture element extraction section 45, the number A of effective picture elements in the effective picture element range 65 shown in FIG. 9, is extracted. At the dummy picture element deletion section 49, the picture elements [1], [2] of the dummy picture element 66 in which the insertion portion is shown by the record picture element range 64 (A+2) relative to the effective picture element range 65 (A) in the horizontal direction of the scanning line 1 and 1 picture element is expressed by 8 bits, are deleted.

When the dummy picture element is deleted, the output signal thereof is supplied to the scanning line counter 50. At the scanning line counter 50, the number M of scanning lines has been preset in advance, and the vertical scanning clock 1 not shown in the figure is counted, and a discordance signal is outputted. The discordance signal is supplied to the start picture element detection section 46. At the start picture element detection section 46, the picture element [3] at the left end of the scanning line 2 as the start picture element of the picture frame shown in FIG. 9, is detected. The detected start picture element [3] is supplied to the effective picture element counter 47. At the effective picture element counter 47, the horizontal scanning clock (not shown in the figure) is counted up to the picture elements 3, 4, . . . , 1, 2, 3, 4, . . . 1, 2, and if the counted value coincides with the preset value, the count comes to an end, and a coincidence signal is outputted. The coincidence signal is supplied to the auxiliary signal adding section 48. At the auxiliary signal adding section 48, the auxiliary signal data such as a header signal having a synchronization signal or the like related to transmission, are added to the effective picture element data. The effective picture element data to which the auxiliary signal data are added, are supplied to the dummy picture element deletion section 49. By the effective picture element extraction section 45, the number A of effective picture elements in the effective picture element range 65 shown in FIG. 9 is extracted. At the dummy picture element deletion section 49, the dummy picture elements 66 [3], [4] in which the insertion portion is shown by the record picture element range 64 (A+2) relative to the effective picture element range 65 (A) in the horizontal direction of the scanning line 2 and 1 picture element is expressed by 8 bits, are deleted. When the dummy picture element is deleted, the output signal thereof is supplied to the scanning line counter 50.

At the scanning line counter 50, the vertical scanning clock 2 not shown in the figure is counted, and a discordance signal is outputted. The discordance signal is supplied to the start picture element detection section 46. At the start picture element detection section 46, the picture element [5] at the left end of the scanning line 3 as the start picture element of the picture frame shown in FIG. 9, is detected. The detected start picture element [5] is supplied to the effective picture element counter 47. At the effective picture element counter 47, the horizontal scanning clock not shown in the figure is counted up to the picture elements 5, 6, . . . , 3, 4, 5, 6, . . . , 3, 4, and if the counted value coincides with the preset value, the count comes to an end and a coincidence signal is outputted. The coincidence signal is supplied to the auxiliary signal adding section 48. At the auxiliary signal adding section 48, the auxiliary signal data such as a header signal having a synchronization signal or the like related to transmission, are added to the effective picture element data. The effective picture element data to which the auxiliary signal data are added, are supplied to the dummy picture element deletion section 49. By the effective picture element extraction section 45, the number A of effective picture elements in the effective picture element range 65 shown in FIG. 9, is extracted. At the dummy picture element deletion section 49, the dummy picture elements 66 [5], [6] in which the insertion portion is shown by the record picture element range 64 (A+2) relative to the effective picture element range 65 (A) in the horizontal direction of the scanning line 3 and 1 picture element is expressed by 8 bits, are deleted. When the dummy picture element is deleted, the output signal thereof is supplied to the scanning line counter 50.

After that, the repetition is performed in order, and at the scanning line counter 50, the vertical scanning clock M-1 not shown in the figure is counted, and a discordance signal is outputted. The discordance signal is supplied to the start picture element detection section 46. At the start picture element detection section 46, the picture element [6] at the left end of the scanning line M as the start picture element of the picture frame shown in FIG. 9, is detected. The detected start picture element [6] is supplied to the effective picture element counter 47. At the effective picture element counter 47, the horizontal scanning clock not shown in the figure is counted up to the picture elements 6, 7, . . . , 4, 5, 6, 7, . . . , 4, 5, and if the counted value coincides with the preset value, the count comes to an end and a coincidence signal is outputted. The coincidence signal is supplied to the auxiliary signal adding section 48. At the auxiliary signal adding section 48, the auxiliary signal data such as a header signal having a synchronization signal or the like related to transmission, are added to the effective picture element data. The effective picture element data to which the auxiliary signal data are added, are supplied to the dummy picture element deletion section 49. By the effective picture element extraction section 45, the number A of effective picture elements in the effective picture element range 65 shown in FIG. 9, is extracted. At the dummy picture element deletion section 49, the picture elements [6], [7] shown by the dummy picture elements 66 in which 1 picture element is expressed by 8 bits, relative to the effective picture element range 65 (A) in the horizontal direction of the scanning line M, are deleted. When the dummy picture element is deleted, the output signal thereof is supplied to the scanning line counter 50.

At the scanning line counter 50, the vertical scanning clock M not shown in the figure is counted, and is counted up to the scanning lines 1, 2, . . . , M, and if the counted value coincides with the preset value, the count comes to an end and a coincidence signal is outputted. The coincidence signal is supplied to the start picture element detection section 31. Consequently, the action in this frame in the start picture element detection section 46 comes to an end. After that, the action moves to the action of the next frame. Thus, the action of dummy picture element deletion of each frame is performed in order.

The picture element data subjected to the action of dummy picture element deletion by the picture element deletion processing block 12 are supplied to the picture element concealment processing block 11. As shown in FIG. 6, at the picture element concealment processing block 11, the concealment processing of the picture element where the above mentioned error flag at the time of data read-out (hereafter referred to simply as an error flag) is set up, is performed. By the way, here, the description will be given as for the picture element, wherein as mentioned above, 1 picture element is composed of 8 bits and 8 bits correspond to 1 word. A calculation of the ideal direction is performed as for the picture element of each point on the picture frame by referring to the value of the picture elements of the adjacent points thereof, and the concealment processing is performed on the basis of the ideal direction found by the calculation and the error flag of the picture element of each point.

First, at the judgment circuit 51, the possibility of interpolation and replacement is judged from the error flags of 8 points around the object picture element and the ideal direction found by the calculation of 1 direction among the horizontal direction, the vertical direction, the diagonally up to the left direction, the diagonally up to the right direction. That is, at the interpolation/replacement possibility judgment section 52, whether interpolation is possible, is preferentially judged, and if interpolation is not possible, whether replacement is possible, is judged. At the interpolation/replacement direction determination section 53, either of the ideal directions is preferentially judged, and when the ideal directions are not possible, another direction is determined.

Specifically, whether an error flag of the object picture element is set up or not, is judged. If the error flag of the object picture element is not set up, the data are passed through. If the error flag of the object picture element is set up, whether interpolation is possible or not, is judged at the interpolation/replacement possibility judgment section 52. If interpolation is judged to be possible at the interpolation/replacement possibility judgment section 52, whether interpolation is possible in an ideal direction or not, is judged at the interpolation/replacement direction determination section 53. If interpolation in an ideal direction is not judged to be possible at the interpolation/replacement direction determination section 53, whether interpolation in another direction is possible or not, is judged. The order of priority in determining another direction is the order of the horizontal direction, the vertical direction, the diagonally up to the left direction, and the diagonally up to the right direction.

Next, if replacement is judged to be possible at the interpolation/replacement possibility judgment section 52, whether replacement is possible in an ideal direction or not is judged at the interpolation/replacement direction determination section 53. When replacement is judged to be impossible in an ideal direction at the interpolation/replacement direction determination section 53, whether replacement is possible in another direction or not, is judged. The order of priority in determining another direction is the order of the horizontal direction, the vertical direction, the diagonally up to the left direction, and the diagonally up to the right direction.

In this way, in the judgment circuit 51, whether interpolation or replacement is possible or not, is judged at the interpolation/replacement possibility judgment section 52, and whether interpolation or replacement is possible in an ideal direction or in another direction or not, is judged at the interpolation/replacement direction determination section 53.

When it is judged at the judgment circuit 51 that interpolation is possible in the vertical direction, interpolation processing is performed at the interpolation processing circuit 54. In the interpolation processing, interpolation is performed between 2 points in the vertical direction when both the upper and lower 2 points in the vertical direction of the object picture element have no error flag set up. That is, when the picture element data [2] of the scanning line number 2 in FIG. 9 is in error, the interpolation is performed by using the picture element data of [7] and [4] above and below the object picture element. Furthermore, when it is judged at the judgment circuit 51 that replacement is possible in the diagonally up to the left direction, replacement processing is performed at the replacement processing circuit 55. In the replacement processing, replacement is performed, when either of the 2 points above and bellow the object picture element in the diagonally up to the left direction, has no error flag set up, simply by the either. That is, when the picture element data [2] of the scanning line number 2 in FIG. 9 is in error, the replacement is performed by using either [6] or [5] above or below the object picture element in the diagonally up to the left direction.

Thus, the interpolation and replacement are performed from the error flags of 8 points around the object picture element and the ideal direction found by a calculation of 1 direction among the horizontal direction, the vertical direction, the diagonally up to the left direction, and the diagonally up to the right direction. Accordingly, even in a case where either of the data hard discs is in trouble, according to the present embodiment, the picture element data of [7] and [4] different in the vertical direction of the picture element data [2] in error are read out even if the data hard disc HDD 2 shown in FIG. 9 is in trouble, and therefore, the possibility that error flags are set up to all the picture element data [2] in interpolation or replacement processing of the picture element data [2], is low, and consequently, the possibility that error flags of 8 points around the object picture element [2] are set up, comes to be low, so that the interpolation or replacement processing can be performed by using the picture element of the adjacent points of the object picture element.

The picture signal data subjected to the interpolation processing or the replacement processing are supplied to the processor 9. The picture signal data are subjected to formatting digitally by D1 or D2 format.

In this way, by inserting a redundant picture element in which 1 picture element is expressed by 8 bits, into the last of each scanning line, the adjacent picture elements in the vertical direction between each scanning line can be recorded in different hard discs, and therefore, even if a hard disc is in trouble, the provability that the normal adjacent picture elements are reproduced, is high, so that interpolation of a picture using adjacent picture elements may be easy.

Furthermore, in the present embodiment, it is also possible that the number is selected by increasing or decreasing the number 7 of data hard discs so as not to make the number A of effective picture elements to be a multiple of the number 7 of data hard discs, so that the upper and lower picture elements of the picture signal data may not be recorded in the same data hard disc, without using the picture element insertion processing block 10 or the picture element deletion processing block 12.

The picture signal recording and reproducing apparatus of the present embodiment is a picture signal recording and reproducing apparatus having data hard discs 72 as a plurality of recording media; and a write-in control section and a read-out control section as write-in and read-out control means for controlling write-in or read-out of picture signal data for the plurality of recording media, which further comprises a picture element insertion processing block 10 as a picture element control means for recording the adjacent picture element data in the vertical direction of the picture signal data, in different recording media respectively, when writing the picture signal data in a plurality of recording media by the write-in and read-out control means.

Moreover, the picture signal recording and reproducing apparatus of the present embodiment comprises a picture element deletion processing block 12 as a picture element control means for returning the picture element data of the picture signal data to the above adjacent picture element data, when reading out the picture signal data recorded in a plurality of recording media by the write-in and read-out control means.

Consequently, since the adjacent upper and lower picture elements of the picture signal data are not recorded in the same recording medium, the probability that the adjacent picture elements are read out in a normal state, is high even in a case where either of a plurality of recording media is in trouble, so that the quality of the reproduced picture can be improved, and further, when interpolation processing is performed by using this reproduction picture element data, the probability that the adjacent picture elements are in error, is low, so that the accuracy in interpolation processing can be improved.

Furthermore, the picture signal recording and reproducing apparatus of the present embodiment is the above mentioned picture signal recording and reproducing apparatus, wherein the picture element insertion processing block 10 as a picture element control means is arranged to insert dummy picture element data into the picture element data of the picture signal data, when writing the picture signal data in the data hard discs 72 as a plurality of recording media by the write-in control section and the read-out control section as write-in and read-out control means.

Furthermore, the picture signal recording and reproducing apparatus of the present embodiment is the above mentioned picture signal recording and reproducing apparatus, wherein the picture element deletion processing block 12 as a picture element control means is arranged to delete the dummy picture element data from the picture element data of the picture signal data, when reading out the picture signal data recorded in a plurality of recording media by the write-in and read-out control means.

Consequently, it is possible that the number of effective picture elements in the horizontal direction of the picture signal data may not be a multiple of the number of recording media, and therefore, since it is arranged by a simple structure that the adjacent upper and lower picture elements of the picture signal data may not be recorded in the same recording medium, the probability that the adjacent picture elements are read out in a normal state, is high even when either of the plurality of recording media is in trouble, so that the quality of the reproduced picture can be improved.

Furthermore, the picture signal recording and reproducing apparatus of the present embodiment is the above mentioned picture signal recording and reproducing apparatus, wherein the picture element insertion processing block 10 as a picture element control means is arranged to insert dummy picture element data into the picture element data of the picture signal data, at every 1 scanning line when writing the picture signal data in data hard discs 72 as a plurality of recording media by the write-in control section 9 and the read-out control section 10 as write-in and read-out control means.

Furthermore, the picture signal recording and reproducing apparatus of the present embodiment is the above mentioned picture signal recording and reproducing apparatus, wherein the picture element deletion processing block 12 as a picture element control means is arranged to delete said dummy picture element data from the picture element data of the picture signal data at every 1 scanning line, when reading out the picture signal data recorded in a plurality of recording media by the write-in and read-out control means.

Consequently, it is arranged by a simple structure that the adjacent upper and lower picture elements of the picture signal data may not be recorded in the same recording medium, and further it is also arranged that the adjacent upper and lower picture elements may not be recorded in the adjacent recording media, and therefore, the probability that the adjacent picture elements are read out in a normal state, is high even when either of adjacent ones in a plurality of recording media is in trouble, so that the quality of the reproduced picture can be improved.

Furthermore, in the above description, in a case where the value of (the number A of effective picture elements+the number L of dummy picture elements) * the number M of scanning lines is a multiple of the number 7 of data hard discs, the same picture element of the next frame is recorded in the same data hard disc. Therefore, it may also be arranged that as shown in FIG. 9, at the end of the last scanning line of each frame, after the dummy picture element 66 where 1 picture element is expressed by 8 bits, [1] and [2] are further inserted by the dummy picture element insertion section 43 as a dummy picture element 67 where 1 picture element is expressed by 8 bits.

The action in this case will be described. In the above mentioned inserting action of the dummy picture element 66 inserted at every scanning line, the vertical scanning clock M not shown in the figure is counted at the scanning line counter 44, and is counted up to the scanning lines 1, 2, . . . , M, and when the counted value coincides with the preset value, the count comes to an end and a coincidence signal is outputted. The coincidence signal is supplied to the start picture element detection section 41. At this time, at the effective picture element extraction section 40, a control is performed by the processor 9 so that the number A+2 of record picture elements shown by the record picture element range 64 may be extracted in place of the number A of effective picture elements. Then, after [6] and [7] have been inserted in the dummy picture element insertion section 43, as the dummy picture element 66 where 1 picture element is expressed by 8 bits, at the end of the last scanning line of this frame, [1] and [2] are further inserted as the dummy picture element 67 where 1 picture element is expressed by 8 bits. Consequently, the action in this frame comes to an end. After that, the action advances to the action of the next frame. In this manner, the action of dummy picture element insertion of each frame is performed in order. Since other actions are similar to those of the above description, the description thereof is omitted.

According to the picture signal recording and reproducing apparatus of the present embodiment, in the above description, the picture element insertion processing block 10 as the picture element control means is arranged such that when writing the picture signal data in the data hard discs 72 as a plurality of recording media by the write-in control section and the read-out control section as the write-in and read-out control means, the first dummy picture element data are inserted into the picture element data of the picture signal data at every 1 scanning line, and the second dummy picture elements are inserted at every 1 frame.

Furthermore, according to the picture signal recording and reproducing apparatus of the present embodiment, in the above description, the picture element deletion processing block 12 as the picture element control means is arranged such that when reading out the picture signal data recorded in a plurality of recording media by the write-in and read-out control means, the first dummy picture element data are deleted from the picture element data of the picture signal data at every 1 scanning line, and the above second dummy picture elements are deleted at every 1 frame.

Consequently, even in a case where the value obtained by adding the first dummy picture element to the number of the effective picture elements is a multiple of the number of recording media, the same picture element of the next frame is not recorded in the same recording medium, and therefore, since it is arranged by a simple structure that the adjacent upper and lower picture elements of the picture signal data are not recorded in the same recording medium, the probability that the adjacent picture elements are read out in a normal state, is high even when either of a plurality of recording media is in trouble, so that the quality of the reproduced picture can be further improved.

Furthermore, in this case, it can also be arranged that without inserting the dummy picture elements 66 in which 1 picture element is expressed by 8 bits at every scanning line, only the dummy picture elements 67 in which 1 picture element is expressed by 8 bits, may be inserted into the end of the last scanning line of each frame.

The action in this case will be described. In the above mentioned insertion action of the dummy picture elements 66 in which 1 picture element is expressed by 8 bits, to be inserted at every scanning line, the processor 9 performs a control so that the dummy picture element insertion section 43 may not operate until the scanning lines 1 to M−1, and the vertical scanning clock M not shown in the figure is counted at the scanning line counter 44, and is counted up to the scanning lines 1, 2, . . . , M, and when the counted value coincides with the preset value, the count comes to an end and a coincidence signal is outputted. The coincidence signal is supplied to the start picture element detection section 41. At this time, in the effective picture element extraction section 40, the number A of effective picture elements is extracted. Then, at the dummy picture element insertion section 43, only the dummy picture elements 67 where 1 picture element is expressed by 8 bits are inserted into the end of the last scanning line of this frame. Consequently, the action in this frame comes to an end. After that, the action moves to the action of the next frame. In this way, the action of dummy picture element insertion of each frame is performed in order. Since other actions are similar to those of the above description, the description thereof is omitted.

Furthermore, it can also be arranged that in the processor 9, by providing a memory which exchanges the order of the picture elements and reads out them by performing the write-in at every picture element to change the read-out address, the upper and lower picture elements of the picture signal data are not recorded in the same data hard disc, without using the picture element insertion means or the picture element deletion means.

Furthermore, the picture signal recording and reproducing apparatus of the present embodiment is a picture signal recording and reproducing apparatus having a plurality of recording and reproducing units which are respectively driven independently, which comprises a striping means for striping the bit stream of the supplied picture signal at every picture element unit; and a record control means for assigning the picture element data striped by said striping means to the plurality of recording and reproducing units, so that the adjacent picture element data in the horizontal direction and in the vertical direction of the picture signal may be recorded in different recording and reproducing units respectively.

Furthermore, the picture signal recording and reproducing method of the present embodiment is a picture signal recording and reproducing method to record the picture signal in a plurality of recording and reproducing units which are respectively driven independently, and to reproduce the picture signal from the plurality of recording and reproducing units, in which the bit stream of the supplied picture signal is striped at every picture element unit, and in which the striped picture element data are assigned to the plurality of recording and reproducing units respectively so that the adjacent picture element data in the horizontal direction and in the vertical direction of the picture signal may be recorded in different recording and reproducing units respectively.

Consequently, since different picture element data can be arranged in the vertical direction of the picture signal data, it does not occur that all upper and lower picture element data are in error, even when either of the plurality of recording means is in trouble, so that the quality of the picture element data can be improved.

EFFECT OF THE INVENTION

The picture signal recording and reproducing apparatus of the present invention is a picture signal recording and reproducing apparatus having a plurality of recording media, and a write-in and read-out control means for controlling write-in or read-out of picture signal data for the plurality of recording media, which comprises a picture element control means for recording the adjacent picture element data of the picture signal data in the vertical direction in different recording media respectively when writing the picture signal data in the plurality of recording media by the write-in and read-out control means.

Furthermore, the picture signal recording and reproducing apparatus of the present invention is the above mentioned picture signal recording and reproducing apparatus, which comprises a picture element control means for returning the picture element data of the picture signal data to the above adjacent picture element data when reading out the picture signal data recorded in the plurality of recording media by the write-in and read-out control means.

Consequently, since the adjacent upper and lower picture elements of the picture signal data are not recorded in the same recording medium, the probability that the adjacent picture elements are read out in a normal state, is high even when either of the plurality of recording media is in trouble, so that the quality of the reproduced picture can be improved, and further, when performing interpolation processing by using this reproduction picture element data, the probability that the adjacent picture elements are in error, is low, so that the accuracy in interpolation processing can be improved.

Furthermore, the picture signal recording and reproducing apparatus of the present invention is the above mentioned picture signal recording and reproducing apparatus, wherein the picture element control means is arranged to insert the dummy picture element data into the picture element data of the picture signal data when writing the picture signal data in the plurality of recording media by the write-in and read-out control means.

Furthermore, the picture signal recording and reproducing apparatus of the present invention is the above mentioned picture signal recording and reproducing apparatus, wherein the picture element control means is arranged to delete the dummy picture element data from the picture element data of the picture signal data when reading out the picture signal data recorded in the plurality of recording media by the write-in and read-out control means.

Consequently, it can be arranged that the number of effective picture elements in the horizontal direction of the picture signal data may not be a multiple of the number of recording media, and therefore, since it is arranged by a simple structure that the adjacent upper and lower picture elements of the picture signal data are not recorded in the same recording medium, the probability that the adjacent picture elements are read out in a normal state, is high even when either of the plurality of recording media is in trouble, so that the quality of the reproduced picture can be improved.

Further more, the picture signal recording and reproducing apparatus of the present invention is the above mentioned picture signal recording and reproducing apparatus, wherein the picture element control means is arranged to insert the dummy picture element data into the picture element data of the picture signal data at every 1 scanning line when writing the picture signal data in the plurality of recording media by the write-in and read-out control means.

Furthermore, the picture signal recording and reproducing apparatus of the present invention is the above mentioned picture signal recording and reproducing apparatus, wherein the picture element control means is arranged to delete the above dummy picture element data from the picture element data of the picture signal data at every 1 scanning line when reading out the picture signal data recorded in the plurality of recording media by the write-in and read-out control means.

Consequently, such an effect is achieved that since it is arranged by a simple structure that the adjacent upper and lower picture elements of the picture signal data are not recorded in the same recording medium, and further it is also arranged that the adjacent upper and lower picture elements are not recorded in the adjacent recording media, the probability that the adjacent picture elements are read out in a normal state, is high even when either of the adjacent ones of the plurality of adjacent recording media is in trouble, so that the quality of the reproduced picture can be improved.

Furthermore, the picture signal recording and reproducing apparatus of the present invention is the above mentioned picture signal recording and reproducing apparatus, wherein the picture element control means is arranged to insert the first dummy picture element data into the picture element data of the picture signal data at every 1 scanning line, and to insert the second dummy picture elements at every 1 frame, when writing the picture signal data in the plurality of recording media by the write-in and read-out control means.

Furthermore, the picture signal recording and reproducing apparatus of the present invention is the above mentioned picture signal recording and reproducing apparatus, wherein the picture element control means is arranged to delete the first picture element data from the picture element data of the picture signal data at every 1 scanning line, and to delete the above second dummy picture elements at every 1 frame, when reading out the picture signal data recorded in the plurality of recording media by the write-in and read-out control means.

This achieves such an effect that even in a case where the value obtained by adding the first dummy picture elements to the number of effective picture elements is a multiple of the number of recording media, the same picture element of the next frame is not recorded in the same recording medium, and therefore, since it is arranged by a simple structure that the adjacent upper and lower picture elements of the picture signal data are not recorded in the same recording medium, the probability that the adjacent picture elements are read out in a normal state, is high even when either of the plurality of recording media is in trouble, so that the quality of the reproduced picture can further be improved.

Furthermore, the picture signal recording and reproducing apparatus of the present invention is a picture signal recording and reproducing apparatus having a plurality of recording and reproducing units which are respectively driven independently, which comprises a striping means for striping the bit stream of the supplied picture signal at every picture element unit; and a record control means for assigning the picture element data striped by said striping means to the above said plurality of recording and reproducing units so that the adjacent picture element data of said picture signal in the horizontal direction and in the vertical direction may be recorded in different recording and reproducing units respectively.

Furthermore, the picture signal recording and reproducing method of the present invention is a picture signal recording and reproducing method for recording the picture signal in a plurality of recording and reproducing units which are respectively driven independently, and for reproducing the picture signal from the plurality of recording and reproducing units, in which the bit stream of the supplied picture signal is striped at every picture element unit, and in which the above said striped picture element data are assigned to the plurality of recording and reproducing units respectively, so that the adjacent picture element data of the picture signal in the horizontal direction and in the vertical direction may be recorded in different recording and reproducing units respectively.

This achieves such an effect that since different picture element data can be arranged in the vertical direction of the picture signal data, it does not occur that all upper and lower picture element data are in error, even when either of the plurality of recording means is in trouble, so that the quality of the picture element data can be improved.

INDUSTRIAL APPLICABILITY

The present invention can be utilized, for example, in a picture signal recording and reproducing apparatus which performs write-in and read-out of a plurality of hard discs used in a video server apparatus for supplying various types of pictures to individual users at the same time on the basis of requests of a large number of users.

Explanation of referenced numerals

9 . . . the processor
10 . . . the picture element insertion processing block
11 . . . the picture element deletion processing block
12 . . . the picture element concealment processing block
13 . . . the striping block
14 . . . the parity generation block
15 . . . the integration block
16 . . . the read/write control block 18, 22, 23, 27, 28, 32, 33 the FIFO
19 . . . the SPC 1
24 . . . the SPC 2
29 . . . the SPC 7
34 . . . the SPC P
20 . . . the HHD 1
25 . . . the HHD 2
30 . . . the HHD 7
35 . . . the HHD P 26, 31, 36 . . . the controllers
37 . . . the CPU
38 . . . the ROM
39 . . . the SRAM
40 . . . the effective picture element extraction section
41 . . . the start picture element detection section
42 . . . the effective picture element counter
43 . . . the dummy picture element insertion section
44 . . . the scanning line counter
45 . . . the effective picture element extraction section
46 . . . the start picture element detection section
47 . . . the effective picture element counter
48 . . . the auxiliary signal adding section
49 . . . the dummy picture element deletion section
50 . . . the scanning line counter
51 . . . the judgment circuit
52 . . . the interpolation/replacement possibility judgment section 53 . . . the interpolation/replacement direction determination section
54 . . . the interpolation processing circuit
55 . . . the replacement processing circuit
56 . . . the data dividing means
57 . . . the striping unit write-in means
58 . . . the parity write-in means
59 . . . the write-in error detection means
60 . . . the striping unit read-out means
61 . . . the read-out error detection means
62 . . . the striping unit restoration means
63 . . . the data composition means
64 . . . the record picture element range
A+2 . . . the number of record picture elements
65 . . . the effective picture element range
A . . . the number of effective picture elements
66 . . . the dummy picture element
67 . . . the dummy picture element
68 . . . the record picture element
69 . . . the record picture element
70 . . . the record picture element
71 . . . the parity data
72 . . . the data hard discs (HDD 1, HDD 2, . . . HDD 7)
73 . . . the parity hard disc (HDD P)

What is claimed is:

1. In a picture signal recording and reproducing apparatus having a plurality of recording media and a write-in and read-out control means for controlling write-in or read-out of picture signal data for said plurality of recording media,
the picture signal recording and reproducing apparatus being characterized by comprising:
a picture element control means for recording vertically adjacent picture element data of said picture signal data in different recording media respectively, when writing picture signal data in said plurality of recording media by said write-in and read-out control means.

2. In a picture signal recording and reproducing apparatus as claimed in claim 1,
the picture signal recording and reproducing apparatus being characterized in that said picture element control means returns picture element data of said picture signal data to said adjacent picture element data, when reading out picture signal data recorded in said plurality of recording media by said write-in and read-out control means.

3. In a picture signal recording and reproducing apparatus as claimed in claim 1,
the picture signal recording and reproducing apparatus being characterized in that said picture element control means inserts dummy picture element data into picture element data of said picture signal data, when writing picture signal data in said plurality of recording media by said write-in and read-out control means.

4. In a picture signal recording and reproducing apparatus as claimed in claim 3,
the picture signal recording and reproducing apparatus being characterized in that said picture element control means is arranged to delete said dummy picture element data from picture element data of said picture signal data, when reading out picture signal data recorded in said plurality of recording media by said write-in and read-out control means.

5. In a picture signal recording and reproducing apparatus as claimed in claim 1,
the picture signal recording and reproducing apparatus being characterized in that said picture element control means inserts dummy picture element data into picture element data of said picture signal data at every 1 scanning line, when writing picture signal data in said plurality of recording media by said write-in and read-out control means.

6. In a picture signal recording and reproducing apparatus as claimed in claim 5,
the picture signal recording and reproducing apparatus being characterized in that said picture element control means is arranged to delete said dummy picture element data from picture element data of said picture signal data at every 1 scanning line, when reading out picture signal data recorded in said plurality of recording media by said write-in and read-out control means.

7. In a picture signal recording and reproducing apparatus as claimed in claim 1,
the picture signal recording and reproducing apparatus being characterized in that said picture element control means inserts first dummy picture element data into picture element data of said picture signal data at every 1 scanning line, and inserts a second dummy picture element at every 1 frame, when writing picture signal data in said plurality of recording media by said write-in and read-out control means.

8. In a picture signal recording and reproducing apparatus as claimed in claim 7,
the picture signal recording and reproducing apparatus being characterized in that said picture element control means is arranged to delete said first dummy picture element data from picture element data of said picture signal data at every 1 scanning line, and to delete said second dummy picture element at every 1 frame, when reading out picture signal data recorded in said plurality of recording media by said write-in and read-out control means.

9. In a picture signal recording and reproducing apparatus as claimed in claim 1,
the picture signal recording and reproducing apparatus being characterized in that said picture element control means performs concealment processing for picture signal data in which abnormality has occurred by vertically adjacent picture element data, when abnormality has occurred in reading out picture signal data recorded in said plurality of recording media by said write-in and read-out control means.

10. In a picture signal recording and reproducing apparatus as claimed in claim 3,
the picture signal recording and reproducing apparatus being characterized in that said picture element control means comprises an effective picture element extraction section for extracting an effective picture element in the horizontal direction of picture signal data to be written in, a dummy picture element insertion section for inserting 1 picture element of dummy picture element into an effective picture element, and a scanning number counter for counting a number of scanning lines.

11. In a picture signal recording and reproducing apparatus as claimed in claim 2,
the picture signal recording and reproducing apparatus being characterized in that said picture element control means comprises an effective picture element extraction section for extracting an effective picture element in the horizontal direction of read-out picture signal data, an auxiliary signal adding section for adding an auxiliary signal to an effective picture element in the horizontal direction of read-out picture signal data, a dummy picture element deletion section for deleting one picture element of dummy picture element inserted into an effective picture element in the horizontal direction of read-out picture signal data, and a scanning line counter for counting a number of scanning lines.

12. In a picture signal recording and reproducing apparatus as claimed in claim 9, the picture signal recording and reproducing apparatus being characterized in that said picture element control means comprises a judgment circuit for judging possibility of interpolation and replacement on the basis of abnormality in data read-out of 8 points around an object picture element of concealment processing, an interpolation processing circuit for performing interpolation between 2 points in the vertical direction when both upper and lower 2 points of said object picture element have no abnormality in said data read-out, and a replacement processing circuit for simply performing replacement by either one when either of 2 points diagonally above and below said object picture element has no abnormality in said data read-out.

13. In a picture signal recording and reproducing apparatus as claimed in claim 1, the picture signal recording and reproducing apparatus being characterized in that a write-in control section of said write-in and read-out control means comprises a data dividing means for striping a bit stream of a picture signal at every picture element unit, a striping unit write-in means for writing a plurality of striped picture element data in said plurality of recording media, a parity write-in means for writing parity data generated from the plurality of striped picture element data, into said plurality of recording media, and a write-in error detection means for detecting a write-in error when writing said plurality of picture element data and the parity data in said plurality of recording media.

14. In a picture signal recording and reproducing apparatus as claimed in claim 1, the picture signal recording and reproducing apparatus being characterized in that a read-out control section of said write-in and read-out control means comprises a striping unit read-out means for reading out a plurality of striped picture element data and parity data from said plurality of recording media, a read-out error detection means for detecting a read-out error when reading out said plurality of picture element data and parity data from said plurality of recording media; a striping unit restoration means for restoring picture element data in which said read-out error has occurred by using said parity data, and a data composition means for composing plurality of striped picture element data which have been restored to generate a bit stream of a picture signal.

15. In a picture signal recording and reproducing apparatus having a plurality of recording and reproducing units which are respectively driven independently, the picture signal recording and reproducing apparatus being characterized by comprising a striping means for striping a bit stream of a supplied picture signal at every picture element unit, and a record control means for assigning picture element data striped by said striping means to said plurality of recording and reproducing units so that vertically adjacent picture element data of said picture signal are recorded in different recording and reproducing units, and so that horizontally adjacent picture element data of said picture signal are recorded in different recording and reproducing units.

16. In a picture signal recording and reproducing apparatus as claimed in claim 15, the picture signal recording and reproducing apparatus being characterized in that said record control means makes said vertically adjacent picture element data recorded in different recording and reproducing units respectively, by inserting specified dummy picture element data into a bit stream of said picture signal at every 1 horizontal scanning period of said picture signal.

17. In a picture signal recording and reproducing apparatus as claimed in claim 15, the picture signal recording and reproducing apparatus being characterized by further comprising, a parity generation means for generating parity data to detect an error of said plurality of picture element data from the plurality of picture element data striped by said striping means, wherein said record control means records said parity data in a specified recording and reproducing unit different from a recording and reproducing unit for recording said striped picture element data.

18. In a picture signal recording and reproducing apparatus as claimed in claim 17, the picture signal recording and reproducing apparatus being characterized by further comprising, a reproduction control means for reproducing said plurality of picture element data and said parity data corresponding to said plurality of picture element data, from said plurality of recording and reproducing units; and an integration means for integrating a plurality of picture element data reproduced by said reproduction control means to be a bit stream of said supplied picture signal.

19. In a picture signal recording and reproducing apparatus as claimed in claim 18, the picture signal recording and reproducing apparatus being characterized by comprising an interpolation means for interpolating, when the plurality of picture element data cannot be read out normally because of abnormality in reproducing action of said plurality of recording and reproducing units, said plurality of picture element data which cannot be read out normally, by picture element data in the vertical direction adjacent to said plurality of picture element data which cannot be read out normally.

20. In a picture signal recording and reproducing apparatus as claimed in claim 18, the picture signal recording and reproducing apparatus being characterized in that said integration means comprises an error detection means for detecting an error of the plurality of picture element data read out from said plurality of recording and reproducing units, on the basis of said parity data read out from said specified recording and reproducing unit, and an interpolation means for interpolating the picture element data in which an error has been detected by said error detection means, with the picture element data in the vertical direction adjacent to said picture element data in which an error has been detected.

21. In a picture signal recording and reproducing method for recording a picture signal into a plurality of recording and reproducing units which are respectively driven independently, and for reproducing the picture signal from said plurality of recording and reproducing units, the picture signal recording and reproducing method being characterized in that the bit stream of a supplied picture signal is striped at every picture element unit, and said striped picture element data are assigned to said plurality of recording and reproducing units respectively, so that vertically adjacent picture element data of said picture signal are recorded in different recording and reproducing units, and so that horizontally adjacent picture element data of said picture signal are recorded in different recording and reproducing units.

22. In a picture signal recording and reproducing method as claimed in claim 21, the picture signal recording and reproducing method being characterized in that by inserting specified dummy picture element data into the bit stream of said picture signal at every 1 horizontal scanning period of said picture signal, said vertically adjacent picture element data are made to be recorded in different recording and reproducing units respectively.

23. In a picture signal recording and reproducing method as claimed in claim 22, the picture signal recording and reproducing method being characterized in that from said plurality of striped picture element data, parity data for detecting an error of said plurality of picture element data are generated, and said parity data are recorded in a specified recording and reproducing unit different from a recording and reproducing unit for recording said striped picture element data.

24. In a picture signal recording and reproducing method as claimed in claim 23, the picture signal recording and reproducing method being characterized in that from said plurality of recording and reproducing units, said plurality of picture element data and said parity data corresponding to said plurality of picture element data are reproduced, and said plurality of reproduced picture element data are integrated to be a bit stream of a supplied picture signal.

25. In a picture signal recording and reproducing method as claimed in claim 24, the picture signal recording and reproducing method being characterized in that when a plurality of picture element data cannot be read out normally because of abnormality in reproducing action of said plurality of recording and reproducing units, said plurality of picture element data which cannot be read out normally are interpolated by picture element data in the vertical direction adjacent to said plurality of picture element data which cannot be read out normally.

26. In a picture signal recording and reproducing method as claimed in claim 24, the picture signal recording and reproducing method being characterized in that an error of the plurality of picture element data read out from said plurality of recording and reproducing units is detected on the basis of said parity data read out from said specified recording and reproducing unit, and said picture element data in which an error has been detected are interpolated by picture element data in the vertical direction adjacent to said picture element data in which an error has been detected.

27. In a picture signal recording and reproducing apparatus having a plurality of recording media and a write-in and read-out control means for controlling write-in or read-out of picture signal data for said plurality of recording media, the picture signal recording and reproducing apparatus being characterized by comprising:

a picture element control means for recording vertically adjacent picture element data of said picture signal data in different recording media respectively by inserting dummy picture element data into picture element data of said picture signal data at every 1 scanning line, when writing picture signal data in said plurality of recording media by said write-in and read-out control means.

28. In a picture signal recording and reproducing apparatus as claimed in claim 27, the picture signal recording and reproducing apparatus being characterized in that said picture element control means is arranged to delete said dummy picture element data from picture element data of said picture signal data at every 1 scanning line, when reading out picture signal data recorded in said plurality of recording media by said write-in and read-out control means.

29. In a picture signal recording and reproducing apparatus having a plurality of recording media and a write-in and read-out control means for controlling write-in or read-out of picture signal data for said plurality of recording media, the picture signal recording and reproducing apparatus being characterized by comprising:

a picture element control means for recording vertically adjacent picture element data of said picture signal data in different recording media respectively by inserting first dummy picture element data into picture element data of said picture signal data at every 1 scanning line, and inserting a second dummy picture element at every 1 frame, when writing picture signal data in said plurality of recording media by said write-in and read-out control means.

30. In a picture signal recording and reproducing apparatus as claimed in claim 29, the picture signal recording and reproducing apparatus being characterized in that said picture element control means is arranged to delete said first dummy picture element data from picture element data of said picture signal data at every 1 scanning line, and to delete said second dummy picture element at every 1 frame, when reading out picture signal data recorded in said plurality of recording media by said write-in and read-out control means.

31. In a picture signal recording and reproducing apparatus having a plurality of recording media and a write-in and read-out control means for controlling write-in or read-out of picture signal data for said plurality of recording media, the picture signal recording and reproducing apparatus being characterized by comprising:

a picture element control means for recording vertically adjacent picture element data of said picture signal data in different recording media respectively, when writing picture signal data in said plurality of recording media by said write-in and read-out control means, and for performing concealment processing for picture signal data in which abnormality has occurred by vertically adjacent picture element data, when abnormality has occurred in reading out picture signal data recorded in said plurality of recording media by said write-in and read-out control means.

32. In a picture signal recording and reproducing apparatus as claimed in claim 31, the picture signal recording and reproducing apparatus being characterized in that said picture element control means comprises a judgment circuit for judging possibility of interpolation and replacement on the basis of abnormality in data read-out of 8 points around an object picture element of concealment processing, an interpolation processing circuit for performing interpolation between 2 points in the vertical direction when both upper and lower 2 points of said object picture element have no abnormality in said data read-out, and a replacement processing circuit for simply performing replacement by either one when either of 2 points diagonally above and below said object picture element has no abnormality in said data read-out.

33. In a picture signal recording and reproducing apparatus having a plurality of recording media and a write-in and read-out control means for controlling write-in or read-out of picture signal data for said plurality of recording media, the picture signal recording and reproducing apparatus being characterized by comprising:
a picture element control means for recording vertically adjacent picture element data of said picture signal data in different recording media respectively by inserting dummy picture element data into picture element data of said picture signal data, when writing picture signal data in said plurality of recording media by said write-in and read-out control means, said picture element control means comprising an effective picture element extraction section for extracting an effective picture element in the horizontal direction of picture signal data to be written in, a dummy picture element insertion section for inserting 1 picture element of dummy picture element into an effective picture element, and a scanning number counter for counting a number of scanning lines.

34. In a picture signal recording and reproducing apparatus having a plurality of recording media and a write-in and read-out control means for controlling write-in or read-out of picture signal data for said plurality of recording media, the picture signal recording and reproducing apparatus being characterized by comprising:
a picture element control means for recording vertically adjacent picture element data of said picture signal data in different recording media respectively, when writing picture signal data in said plurality of recording media by said write-in and read-out control means, and for returning picture element data of said picture signal data to said adjacent picture element data, when reading out picture signal data recorded in said plurality of recording media by said write-in and read-out control means.

35. In a picture signal recording and reproducing apparatus having a plurality of recording and reproducing units which are respectively driven independently, the picture signal recording and reproducing apparatus being characterized by comprising a striping means for striping a bit stream of a supplied picture signal at every picture element unit, and a record control means for assigning picture element data striped by said striping means to said plurality of recording and reproducing units so that vertically adjacent picture element data of said picture signal are recorded in different recording and reproducing units, and so that horizontally adjacent picture element data of said picture signal are recorded in different recording and reproducing units, said record control means making said vertically adjacent picture element data recorded in different recording and reproducing units respectively by inserting specified dummy picture element data into a bit stream of said picture signal at every 1 horizontal scanning period of said picture signal.

36. In a picture signal recording and reproducing method for recording a picture signal into a plurality of recording and reproducing units which are respectively driven independently, and for reproducing the picture signal from said plurality of recording and reproducing units, the picture signal recording and reproducing method being characterized in that the bit stream of a supplied picture signal is striped at every picture element unit, and said striped picture element data are assigned to said plurality of recording and reproducing units respectively, so that vertically adjacent picture element data of said picture signal are recorded in different recording and reproducing units, and so that horizontally adjacent picture element data of said picture signal are recorded in different recording and reproducing units, wherein said vertically adjacent picture element data are made to be recorded in different recording and reproducing units respectively by inserting specified dummy picture element data into the bit stream of said picture signal at every 1 horizontal scanning period of said picture signal.

37. In a picture signal recording and reproducing method as claimed in claim 36, the picture signal recording and reproducing method being characterized in that from said plurality of striped picture element data, parity data for detecting an error of said plurality of picture element data are generated, and said parity data are recorded in a specified recording and reproducing unit different from a recording and reproducing unit for recording said striped picture element data.

38. In a picture signal recording and reproducing method as claimed in claim 37, the picture signal recording and reproducing method being characterized in that from said plurality of recording and reproducing units, said plurality of picture element data and said parity data corresponding to said plurality of picture element data are reproduced, and said plurality of reproduced picture element data are integrated to be a bit stream of a supplied picture signal.

39. In a picture signal recording and reproducing method as claimed in claim 38, the picture signal recording and reproducing method being characterized in that when a plurality of picture element data cannot be read out normally because of abnormality in reproducing action of said plurality of recording and reproducing units, said plurality of picture element data which cannot be read out normally are interpolated by picture element data in the vertical direction adjacent to said plurality of picture element data which cannot be read out normally.

40. In a picture signal recording and reproducing method as claimed in claim 38, the picture signal recording and reproducing method being characterized in that an error of the plurality of picture element data read out from said plurality of recording and reproducing units is detected on the basis of said parity data read out from said specified recording and reproducing unit, and said picture element data in which an error has been detected are interpolated by picture element data in the vertical direction adjacent to said picture element data in which an error has been detected.

* * * * *